(12) United States Patent
Johnston et al.

(10) Patent No.: US 12,001,013 B2
(45) Date of Patent: *Jun. 4, 2024

(54) PIXEL INTENSITY MODULATION USING MODIFYING GAIN VALUES

(71) Applicant: Magic Leap, Inc., Plantation, FL (US)

(72) Inventors: Richard Stephen Johnston, Sammamish, WA (US); Brian T. Schowengerdt, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,763

(22) Filed: Jan. 9, 2023

(65) Prior Publication Data

US 2023/0161152 A1 May 25, 2023

Related U.S. Application Data

(63) Continuation of application No. 17/256,961, filed as application No. PCT/US2019/040324 on Jul. 2, 2019, now Pat. No. 11,579,441.

(60) Provisional application No. 62/693,228, filed on Jul. 2, 2018.

(51) Int. Cl.
*G02B 26/10* (2006.01)
*G06V 40/18* (2022.01)
*G09G 3/00* (2006.01)
*G02B 27/01* (2006.01)

(52) U.S. Cl.
CPC ........... *G02B 26/103* (2013.01); *G06V 40/18* (2022.01); *G09G 3/002* (2013.01); *G02B 2027/0118* (2013.01); *G02B 2027/0187* (2013.01); *G09G 2320/0285* (2013.01)

(58) Field of Classification Search
None
See application file for complete search history.

(56) References Cited

U.S. PATENT DOCUMENTS

| 4,344,092 A | 8/1982 | Miller |
| 4,652,930 A | 3/1987 | Crawford |
| 4,810,080 A | 3/1989 | Grendol et al. |
| 4,997,268 A | 3/1991 | Dauvergne |

(Continued)

FOREIGN PATENT DOCUMENTS

| CN | 100416340 C | 9/2008 |
| CN | 101449270 A | 6/2009 |

(Continued)

OTHER PUBLICATIONS

"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).

(Continued)

*Primary Examiner* — Chikaodili E Anyikire
(74) *Attorney, Agent, or Firm* — Stephen M. De Klerk

(57) ABSTRACT

A visual perception device has a look-up table stored in a laser driver chip. The look-up table includes relational gain data to compensate for brighter areas of a laser pattern wherein pixels are located more closely than areas where the pixels are further apart and to compensate for differences in intensity of individual pixels when the intensities of pixels are altered due to design characteristics of an eye piece.

18 Claims, 11 Drawing Sheets

FIG. 1

(56) References Cited

U.S. PATENT DOCUMENTS

| | | |
|---|---|---|
| 5,007,727 A | 4/1991 | Kahaney et al. |
| 5,074,295 A | 12/1991 | Willis |
| 5,240,220 A | 8/1993 | Elberbaum |
| 5,251,635 A | 10/1993 | Dumoulin et al. |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,659,701 A | 8/1997 | Amit et al. |
| 5,682,255 A | 10/1997 | Friesem et al. |
| 5,689,669 A | 11/1997 | Lynch |
| 5,826,092 A | 10/1998 | Flannery |
| 5,854,872 A | 12/1998 | Tai |
| 5,864,365 A | 1/1999 | Sramek et al. |
| 5,937,202 A | 8/1999 | Crosetto |
| 6,002,853 A | 12/1999 | de Hond |
| 6,012,811 A | 1/2000 | Chao et al. |
| 6,016,160 A | 1/2000 | Coombs et al. |
| 6,064,749 A | 5/2000 | Hirota et al. |
| 6,076,927 A | 6/2000 | Owens |
| 6,079,982 A | 6/2000 | Meader |
| 6,117,923 A | 9/2000 | Amagai et al. |
| 6,119,147 A | 9/2000 | Toomey et al. |
| 6,124,977 A | 9/2000 | Takahashi |
| 6,179,619 B1 | 1/2001 | Tanaka |
| 6,191,809 B1 | 2/2001 | Hori et al. |
| 6,219,045 B1 | 4/2001 | Leahy et al. |
| 6,243,091 B1 | 6/2001 | Berstis |
| 6,271,843 B1 | 8/2001 | Lection et al. |
| 6,362,817 B1 | 3/2002 | Powers et al. |
| 6,375,369 B1 | 4/2002 | Schneider et al. |
| 6,385,735 B1 | 5/2002 | Wilson |
| 6,396,522 B1 | 5/2002 | Vu |
| 6,414,679 B1 | 7/2002 | Miodonski et al. |
| 6,538,655 B1 | 3/2003 | Kubota |
| 6,541,736 B1 | 4/2003 | Huang et al. |
| 6,570,563 B1 | 5/2003 | Honda |
| 6,573,903 B2 | 6/2003 | Gantt |
| 6,590,593 B1 | 7/2003 | Robertson et al. |
| 6,621,508 B1 | 9/2003 | Shiraishi et al. |
| 6,690,393 B2 | 2/2004 | Heron et al. |
| 6,757,068 B2 | 6/2004 | Foxlin |
| 6,784,901 B1 | 8/2004 | Harvfey et al. |
| 6,961,055 B2 | 11/2005 | Doak |
| 7,046,515 B1 | 5/2006 | Wyatt |
| 7,051,219 B2 | 5/2006 | Hwang |
| 7,076,674 B2 | 7/2006 | Cervantes |
| 7,111,290 B1 | 9/2006 | Yates, Jr. |
| 7,119,819 B1 | 10/2006 | Robertson et al. |
| 7,219,245 B1 | 5/2007 | Raghuvanshi |
| 7,382,288 B1 | 6/2008 | Wilson |
| 7,414,629 B2 | 8/2008 | Santodomingo |
| 7,431,453 B2 | 10/2008 | Hogan |
| 7,467,356 B2 | 12/2008 | Gettman et al. |
| 7,542,040 B2 | 6/2009 | Templeman |
| 7,573,640 B2 | 8/2009 | Nivon et al. |
| 7,653,877 B2 | 1/2010 | Matsuda |
| 7,663,625 B2 | 2/2010 | Chartier et al. |
| 7,724,980 B1 | 5/2010 | Shenzhi |
| 7,746,343 B1 | 6/2010 | Charaniya et al. |
| 7,751,662 B2 | 7/2010 | Kleemann |
| 7,758,185 B2 | 7/2010 | Lewis |
| 7,788,323 B2 | 8/2010 | Greenstein et al. |
| 7,804,507 B2 | 9/2010 | Yang et al. |
| 7,814,429 B2 | 10/2010 | Buffet et al. |
| 7,817,150 B2 | 10/2010 | Reichard et al. |
| 7,844,724 B2 | 11/2010 | Van Wie et al. |
| 8,060,759 B1 | 11/2011 | Arnan et al. |
| 8,120,851 B2 | 2/2012 | Iwasa |
| 8,214,660 B2 | 7/2012 | Capps, Jr. |
| 8,246,408 B2 | 8/2012 | Elliot |
| 8,353,594 B2 | 1/2013 | Lewis |
| 8,360,578 B2 | 1/2013 | Nummela et al. |
| 8,508,676 B2 | 8/2013 | Silverstein et al. |
| 8,547,638 B2 | 10/2013 | Levola |
| 8,605,764 B1 * | 12/2013 | Rothaar ............ G03B 21/2033 372/29.01 |
| 8,619,365 B2 | 12/2013 | Harris et al. |
| 8,696,113 B2 | 4/2014 | Lewis |
| 8,698,701 B2 | 4/2014 | Margulis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,015,501 B2 | 4/2015 | Gee |
| 9,086,537 B2 | 7/2015 | Iwasa et al. |
| 9,095,437 B2 | 8/2015 | Boyden et al. |
| 9,239,473 B2 | 1/2016 | Lewis |
| 9,244,293 B2 | 1/2016 | Lewis |
| 9,244,533 B2 | 1/2016 | Friend et al. |
| 9,383,823 B2 | 7/2016 | Geisner et al. |
| 9,489,027 B1 | 11/2016 | Ogletree |
| 9,519,305 B2 | 12/2016 | Wolfe |
| 9,581,820 B2 | 2/2017 | Robbins |
| 9,582,060 B2 | 2/2017 | Balatsos |
| 9,658,473 B2 | 5/2017 | Lewis |
| 9,671,566 B2 | 6/2017 | Abovitz et al. |
| 9,671,615 B1 | 6/2017 | Vallius et al. |
| 9,696,795 B2 | 7/2017 | Marcolina et al. |
| 9,798,144 B2 | 10/2017 | Sako et al. |
| 9,874,664 B2 | 1/2018 | Stevens et al. |
| 9,880,441 B1 | 1/2018 | Osterhout |
| 9,918,058 B2 | 3/2018 | Takahasi et al. |
| 9,955,862 B2 | 5/2018 | Freeman et al. |
| 9,978,118 B1 | 5/2018 | Ozgumer et al. |
| 9,996,797 B1 | 6/2018 | Holz et al. |
| 10,018,844 B2 | 7/2018 | Levola et al. |
| 10,082,865 B1 | 9/2018 | Raynal et al. |
| 10,151,937 B2 | 12/2018 | Lewis |
| 10,185,147 B2 | 1/2019 | Lewis |
| 10,218,679 B1 | 2/2019 | Jawahar |
| 10,241,545 B1 | 3/2019 | Richards et al. |
| 10,317,680 B1 | 6/2019 | Richards et al. |
| 10,436,594 B2 | 10/2019 | Belt et al. |
| 10,516,853 B1 | 12/2019 | Gibson et al. |
| 10,551,879 B1 | 2/2020 | Richards et al. |
| 10,578,870 B2 | 3/2020 | Kimmel |
| 10,698,202 B2 | 6/2020 | Kimmel et al. |
| 10,856,107 B2 | 10/2020 | Mycek et al. |
| 10,825,424 B2 | 11/2020 | Zhang |
| 10,987,176 B2 | 4/2021 | Poltaretskyi et al. |
| 11,190,681 B1 * | 11/2021 | Brook ................ H04N 5/23225 |
| 11,209,656 B1 * | 12/2021 | Choi ...................... G06F 3/147 |
| 11,236,993 B1 * | 2/2022 | Hall ........................ G01B 11/25 |
| 2001/0010598 A1 | 8/2001 | Aritake et al. |
| 2001/0018667 A1 | 8/2001 | Kim |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |
| 2002/0095463 A1 | 7/2002 | Matsuda |
| 2002/0113820 A1 | 8/2002 | Robinson et al. |
| 2002/0122648 A1 | 9/2002 | Mule' et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0080976 A1 | 5/2003 | Satoh et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |

(56) References Cited

U.S. PATENT DOCUMENTS

| | | |
|---|---|---|
| 2004/0113887 A1 | 6/2004 | Pair et al. |
| 2004/0174496 A1 | 9/2004 | Ji et al. |
| 2004/0186902 A1 | 9/2004 | Stewart |
| 2004/0193441 A1 | 9/2004 | Altieri |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0093719 A1 | 5/2005 | Okamoto et al. |
| 2005/0128212 A1 | 6/2005 | Edecker et al. |
| 2005/0157159 A1 | 7/2005 | Komiya et al. |
| 2005/0177385 A1 | 8/2005 | Hull |
| 2005/0231599 A1 | 10/2005 | Yamasaki |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0030429 A1 | 2/2008 | Hailpern |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0125218 A1 | 5/2008 | Collins |
| 2008/0146942 A1 | 6/2008 | Dala-Krishna |
| 2008/0173036 A1 | 7/2008 | Willaims |
| 2008/0177506 A1 | 7/2008 | Kim |
| 2008/0183190 A1 | 7/2008 | Adcox et al. |
| 2008/0205838 A1 | 8/2008 | Crippa et al. |
| 2008/0215907 A1 | 9/2008 | Wilson |
| 2008/0225393 A1 | 9/2008 | Rinko |
| 2008/0235570 A1 | 9/2008 | Sawada et al. |
| 2008/0246693 A1 | 10/2008 | Hailpern et al. |
| 2008/0316768 A1 | 12/2008 | Travis |
| 2009/0076791 A1 | 3/2009 | Rhoades et al. |
| 2009/0091583 A1 | 4/2009 | McCoy |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0287728 A1 | 11/2009 | Martine et al. |
| 2009/0300528 A1 | 12/2009 | Stambaugh |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0070378 A1 | 3/2010 | Trotman et al. |
| 2010/0079841 A1 | 4/2010 | Levola |
| 2010/0115428 A1 | 5/2010 | Shuping et al. |
| 2010/0153934 A1 | 6/2010 | Lachner |
| 2010/0194632 A1 | 8/2010 | Raento et al. |
| 2010/0205541 A1 | 8/2010 | Rappaport et al. |
| 2010/0214284 A1 | 8/2010 | Rieffel et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0274567 A1 | 10/2010 | Carlson et al. |
| 2010/0274627 A1 | 10/2010 | Carlson |
| 2010/0277803 A1 | 11/2010 | Pockett et al. |
| 2010/0284085 A1 | 11/2010 | Laakkonen |
| 2010/0287485 A1 | 11/2010 | Bertolami et al. |
| 2010/0296163 A1 | 11/2010 | Sarikko |
| 2010/0309687 A1 | 12/2010 | Sampsell et al. |
| 2011/0010636 A1 | 1/2011 | Hamilton, II et al. |
| 2011/0021263 A1 | 1/2011 | Anderson et al. |
| 2011/0022870 A1 | 1/2011 | Mcgrane |
| 2011/0041083 A1 | 2/2011 | Gabai et al. |
| 2011/0050640 A1 | 3/2011 | Lundback et al. |
| 2011/0050655 A1 | 3/2011 | Mukawa |
| 2011/0064268 A1 | 3/2011 | Cobb et al. |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0215094 A1 | 8/2012 | Rahimian et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0307075 A1 | 12/2012 | Margalitq |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050258 A1 | 2/2013 | Liu et al. |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0061240 A1 | 3/2013 | Yan et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0002329 A1 | 1/2014 | Nishimaki et al. |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |

(56) References Cited

U.S. PATENT DOCUMENTS

| | | |
|---|---|---|
| 2014/0244983 A1 | 8/2014 | McDonald et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0292645 A1 | 10/2014 | Tsurumi et al. |
| 2014/0313228 A1 | 10/2014 | Kasahara |
| 2014/0340498 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0077312 A1 | 3/2015 | Wang |
| 2015/0097719 A1* | 4/2015 | Balachandreswaran ............ G01B 11/002 342/147 |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235427 A1 | 8/2015 | Nobori et al. |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0015470 A1 | 1/2016 | Border |
| 2016/0027215 A1 | 1/2016 | Burns et al. |
| 2016/0033770 A1 | 2/2016 | Fujimaki et al. |
| 2016/0051217 A1 | 2/2016 | Douglas et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1* | 3/2016 | Buckley .................. G09G 5/10 362/607 |
| 2016/0103326 A1 | 4/2016 | Kimura et al. |
| 2016/0123745 A1 | 5/2016 | Cotier et al. |
| 2016/0139402 A1 | 5/2016 | Lapstun |
| 2016/0139411 A1 | 5/2016 | Kang et al. |
| 2016/0155273 A1 | 6/2016 | Lyren et al. |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0100664 A1 | 4/2017 | Osterhout et al. |
| 2017/0102544 A1 | 4/2017 | Vallius et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0185261 A1 | 6/2017 | Perez et al. |
| 2017/0192239 A1 | 7/2017 | Nakamura et al. |
| 2017/0201709 A1 | 7/2017 | Igarashi et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0214907 A1 | 7/2017 | Lapstun |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0246070 A1 | 8/2017 | Osterhout et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Liu et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0357332 A1 | 12/2017 | Balan et al. |
| 2017/0363871 A1 | 12/2017 | Vallius |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0084245 A1 | 3/2018 | Lapstun |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1 | 5/2018 | Schmirler et al. |
| 2018/0136466 A1 | 5/2018 | Ko |
| 2018/0144691 A1 | 5/2018 | Choi et al. |
| 2018/0150971 A1 | 5/2018 | Adachi et al. |
| 2018/0151796 A1 | 5/2018 | Akahane |
| 2018/0172995 A1 | 6/2018 | Lee et al. |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0217395 A1 | 8/2018 | Lin et al. |
| 2018/0218545 A1 | 8/2018 | Garcia et al. |
| 2018/0250589 A1 | 9/2018 | Cossairt et al. |
| 2018/0260218 A1 | 9/2018 | Gopal |
| 2018/0284877 A1 | 10/2018 | Klein |
| 2018/0292654 A1 | 10/2018 | Wall et al. |
| 2018/0299678 A1 | 10/2018 | Singer et al. |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |

(56) References Cited

U.S. PATENT DOCUMENTS

| | | |
|---|---|---|
| 2019/0107723 A1 | 4/2019 | Lee et al. |
| 2019/0137788 A1 | 5/2019 | Suen |
| 2019/0155034 A1 | 5/2019 | Singer et al. |
| 2019/0155439 A1 | 5/2019 | Mukherjee et al. |
| 2019/0158926 A1* | 5/2019 | Kang ............... H04N 21/43615 |
| 2019/0162950 A1 | 5/2019 | Lapstun |
| 2019/0167095 A1 | 6/2019 | Krueger |
| 2019/0172216 A1 | 6/2019 | Ninan et al. |
| 2019/0178654 A1 | 6/2019 | Hare |
| 2019/0182415 A1 | 6/2019 | Sivan |
| 2019/0196690 A1 | 6/2019 | Chong et al. |
| 2019/0206116 A1 | 7/2019 | Xu et al. |
| 2019/0219815 A1* | 7/2019 | Price .................... G02B 26/101 |
| 2019/0243123 A1 | 8/2019 | Bohn |
| 2019/0287270 A1 | 9/2019 | Nakamura et al. |
| 2019/0318502 A1 | 10/2019 | He et al. |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2019/0388182 A1 | 12/2019 | Kumar et al. |
| 2020/0066045 A1 | 2/2020 | Stahl et al. |
| 2020/0098188 A1 | 3/2020 | Bar-Zeev et al. |
| 2020/0100057 A1 | 3/2020 | Galon et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0184217 A1 | 6/2020 | Faulkner |
| 2020/0184653 A1 | 6/2020 | Faulker |
| 2020/0202759 A1* | 6/2020 | Ukai .................... H04N 9/3155 |
| 2020/0242848 A1 | 7/2020 | Ambler et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1 | 12/2020 | Leeper et al. |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0124901 A1 | 4/2021 | Liu et al. |
| 2021/0132380 A1 | 5/2021 | Wieczorek |
| 2021/0141225 A1 | 5/2021 | Meynen et al. |
| 2021/0142582 A1 | 5/2021 | Jones et al. |
| 2021/0158023 A1 | 5/2021 | Fu et al. |
| 2021/0158627 A1 | 5/2021 | Cossairt et al. |
| 2021/0173480 A1* | 6/2021 | Osterhout ................ G06F 3/013 |
| 2022/0366598 A1 | 11/2022 | Azimi et al. |

FOREIGN PATENT DOCUMENTS

| | | |
|---|---|---|
| CN | 103460255 A | 12/2013 |
| CN | 104040410 A | 9/2014 |
| CN | 104603675 A | 5/2015 |
| CN | 105938426 A | 9/2016 |
| CN | 106662754 A | 5/2017 |
| CN | 107683497 A1 | 2/2018 |
| CN | 109223121 A | 1/2019 |
| CN | 105190427 B | 11/2019 |
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 1494110 A2 | 1/2005 |
| EP | 1938141 A1 | 7/2008 |
| EP | 1943556 A2 | 7/2008 |
| EP | 2290428 A2 | 3/2011 |
| EP | 2350774 A1 | 8/2011 |
| EP | 1237067 B1 | 1/2016 |
| EP | 3139245 A1 | 3/2017 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| GB | 2542853 A | 4/2017 |
| IN | 938/DEL/2004 A | 6/2006 |
| JP | H03-036974 U | 4/1991 |
| JP | H10-333094 A | 12/1998 |
| JP | 2002-529806 | 9/2002 |
| JP | 2003-029198 A | 1/2003 |
| JP | 2003-141574 A | 5/2003 |
| JP | 2003-228027 A | 8/2003 |
| JP | 2003-329873 A | 11/2003 |
| JP | 2005-303843 A | 10/2005 |
| JP | 2007-012530 A | 1/2007 |
| JP | 2007-86696 A | 4/2007 |
| JP | 2007-273733 A | 10/2007 |
| JP | 2008-257127 A | 10/2008 |
| JP | 2009-090689 A | 4/2009 |
| JP | 2009-244869 A | 10/2009 |
| JP | 2010-014443 A | 1/2010 |
| JP | 2010-139575 | 6/2010 |
| JP | 2011-033993 A | 2/2011 |
| JP | 2011-257203 A | 12/2011 |
| JP | 2011-530131 A | 12/2011 |
| JP | 2012-015774 A | 1/2012 |
| JP | 2012-235036 A | 11/2012 |
| JP | 2013-525872 A1 | 6/2013 |
| JP | 2013-206322 A | 10/2013 |
| JP | 2014-500522 A | 1/2014 |
| JP | 2014-192550 A | 10/2014 |
| JP | 2015-191032 A | 11/2015 |
| JP | 2016-502120 A | 1/2016 |
| JP | 2016-85463 A | 5/2016 |
| JP | 2016-516227 A | 6/2016 |
| JP | 2016-126134 A | 7/2016 |
| JP | 2017-015697 A | 1/2017 |
| JP | 2017-153498 | 9/2017 |
| JP | 2017-531840 A | 10/2017 |
| JP | 2017-535825 A | 11/2017 |
| JP | 6232763 B2 | 11/2017 |
| JP | 6333965 B2 | 5/2018 |
| KR | 2005-0010775 A | 1/2005 |
| KR | 10-2006-0059992 A | 6/2006 |
| KR | 10-2011-0006408 | 1/2011 |
| KR | 10-1372623 B1 | 3/2014 |
| KR | 10-2017-0017243 | 2/2017 |
| TW | 201219829 A | 5/2012 |
| TW | 201803289 A | 1/2018 |
| WO | 1991/000565 A2 | 1/1991 |
| WO | 2000/030368 A1 | 6/2000 |
| WO | 2002/071315 A2 | 9/2002 |
| WO | 2004095248 A | 11/2004 |
| WO | 2006132614 A1 | 12/2006 |
| WO | 2007041678 A2 | 4/2007 |
| WO | 2007/037089 A1 | 5/2007 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2010015807 A1 | 2/2010 |
| WO | 2014203440 A1 | 12/2010 |
| WO | 2012030787 A2 | 3/2012 |
| WO | 2013/049012 A1 | 4/2013 |
| WO | 2013062701 A1 | 5/2013 |
| WO | 2013/145536 A1 | 10/2013 |
| WO | 2014033306 A1 | 3/2014 |
| WO | 2015/079610 A1 | 6/2015 |
| WO | 2015/143641 A1 | 10/2015 |
| WO | 2015143641 A1 | 10/2015 |
| WO | 2015194597 A1 | 12/2015 |
| WO | 2016/054092 A1 | 4/2016 |
| WO | 2017004695 A1 | 1/2017 |
| WO | 2017044761 A1 | 3/2017 |
| WO | 2017049163 A1 | 3/2017 |
| WO | 2017051595 A1 | 3/2017 |
| WO | 2017120475 A1 | 7/2017 |
| WO | 2017176861 A1 | 10/2017 |
| WO | 2017/203201 A1 | 11/2017 |

(56) References Cited

FOREIGN PATENT DOCUMENTS

| WO | 2017203201 A1 | 11/2017 |
|---|---|---|
| WO | 2018008232 A1 | 1/2018 |
| WO | 2018/031261 A1 | 2/2018 |
| WO | 2018022523 A1 | 2/2018 |
| WO | 2018/044537 A1 | 3/2018 |
| WO | 2018039273 A1 | 3/2018 |
| WO | 2018057564 A1 | 3/2018 |
| WO | 2018085287 A1 | 5/2018 |
| WO | 2018087408 A1 | 5/2018 |
| WO | 2018097831 A1 | 5/2018 |
| WO | 2018/166921 A | 9/2018 |
| WO | 2018166921 A1 | 9/2018 |
| WO | 2018236587 A1 | 12/2018 |
| WO | 2019040493 A1 | 2/2019 |
| WO | 2019148154 A1 | 8/2019 |
| WO | 2020010226 A1 | 1/2020 |

OTHER PUBLICATIONS

"Communication according to Rule 164(1) EPC dated Feb. 23, 2022", European Patent Application No. 20753144.3 , (11 pages).
"Communication Pursuant to Article 94(3) EPC dated Sep. 4, 2019", European Patent Application No. 10793707.0 , (4 pages).
"Communication Pursuant to Article 94(3) EPC dated Apr. 25, 2022", European Patent Application No. 18885707.2 , (5 pages).
"Communication Pursuant to Article 94(3) EPC dated Jan. 4, 2022", European Patent Application No. 20154070.5 , (8 pages).
"Communication Pursuant to Article 94(3) EPC dated May 30, 2022", European Patent Application No. 19768418.6 , (6 pages).
"Communication Pursuant to Article 94(3) EPC dated Oct. 21, 2021", European Patent Application No. 16207441.3 , (4 pages).
"Communication Pursuant to Rule 164(1) EPC dated Jul. 27, 2021", European Patent Application No. 19833664.6 , (11 pages).
"European Search Report dated Oct. 15, 2020", European Patent Application No. 20180623.9 , (10 pages).
"Extended European Search Report dated May 20, 2020", European Patent Application No. 20154070.5 , (7 pages).
"Extended European Search Report dated Jan. 22, 2021", European Patent Application No. 18890390.0 , (11 pages).
"Extended European Search Report dated Nov. 3, 2020", European Patent Application No. 18885707.2 , (7 pages).
"Extended European Search Report dated Jun. 30, 2021", European Patent Application No. 19811971.1 , (9 pages).
"Extended European Search Report dated Mar. 4, 2021", European Patent Application No. 19768418.6 , (9 pages).
"Extended European Search Report dated Nov. 4, 2020", European Patent Application No. 20190980.1 , (14 pages).
"Extended European Search Report dated Aug. 24, 2022", European Patent Application No. 20846338.0 , (13 pages).
"Extended European Search Report dated Aug. 8, 2022", European Patent Application No. 19898874.3 , (8 pages).
"Extended European Search Report dated Sep. 8, 2022", European Patent Application No. 20798769.4 , (13 pages).
"Extended European Search Report dated Nov. 3, 2022", European Patent Application No. 20770244.0 , (23 pages).
"Extended European Search Report dated Jun. 12, 2017", European Patent Application No. 16207441.3 , (8 pages).
"Extended European Search Report dated Jan. 28, 2022", European Patent Application No. 19815876.8 , (9 pages).
"Extended European Search Report dated Jan. 4, 2022", European Patent Application No. 19815085.6 , (9 pages).
"Extended European Search Report dated Jul. 16, 2021", European Patent Application No. 19810142.0 , (14 pages).
"Extended European Search Report dated Jul. 30, 2021", European Patent Application No. 19839970.1 , (7 pages).
"Extended European Search Report dated Jun. 19, 2020", European Patent Application No. 20154750.2 , (10 pages).
"Extended European Search Report dated Mar. 22, 2022", European Patent Application No. 19843487.0 , (14 pages).
"Extended European Search Report dated May 16, 2022", European Patent Application No. 19871001.4 , (9 pages).
"Extended European Search Report dated May 30, 2022", European Patent Application No. 20753144.3 , (10 pages).
"Extended European Search Report dated Oct. 27, 2021", European Patent Application No. 19833664.6 , (10 pages).
"Extended European Search Report dated Sep. 20, 2021", European Patent Application No. 19851373.1 , (8 pages).
"Extended European Search Report dated Sep. 28, 2021", European Patent Application No. 19845418.3 , (13 pages).
"Final Office Action dated Aug. 10, 2020", U.S. Appl. No. 16/225,961 , (13 pages).
"Final Office Action dated Dec. 4, 2019", U.S. Appl. No. 15/564,517 , (15 pages).
"Final Office Action dated Feb. 19, 2020", U.S. Appl. No. 15/552,897 , (17 pages).
"Final Office Action dated Feb. 23, 2022", U.S. Appl. No. 16/748,193 , (23 pages).
"Final Office Action dated Feb. 3, 2022", U.S. Appl. No. 16/864,721 , (36 pages).
"Final Office Action dated Jul. 13, 2022", U.S. Appl. No. 17/262,991 , (18 pages).
"Final Office Action dated Jun. 15, 2021", U.S. Appl. No. 16/928,313 , (42 pages).
"Final Office Action dated Mar. 1, 2021", U.S. Appl. No. 16/214,575 , (29 pages).
"Final Office Action dated Mar. 19, 2021", U.S. Appl. No. 16/530,776 , (25 pages).
"Final Office Action dated Nov. 24, 2020", U.S. Appl. No. 16/435,933 , (44 pages).
"Final Office Action dated Sep. 17, 2021", U.S. Appl. No. 16/938,782 , (44 pages).
"First Examination Report dated Jul. 27, 2022", Chinese Patent Application No. 201980036675.2 , (5 pages).
"First Examination Report dated Jul. 28, 2022", Indian Patent Application No. 202047024232 , (6 pages).
"First Examination Report dated May 13, 2022", Indian Patent Application No. 202047026359 , (8 pages).
"First Office Action dated Mar. 14, 2022 with English translation", Chinese Patent Application No. 201880079474.6 , (11 pages).
"First Office Action dated Sep. 16, 2022 with English translation", Chinese Patent Application No. 201980063642.7 , (7 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GPP%5FSYNC/SA4/Docs/S4%2DI90526%2Ezip [retrieved on Apr. 12, 2019] , Apr. 12, 2019 , (98 pages).
"International Search Report and Written Opinion dated Feb. 12, 2021", International Application No. PCT/US20/60555 , (25 pages).
"International Search Report and Written Opinion dated Mar. 12, 2020", International PCT Patent Application No. PCT/US19/67919 , (14 pages).
"International Search Report and Written Opinion dated Aug. 15, 2019", International PCT Patent Application No. PCT/US19/33987 , (20 pages).
"International Search Report and Written Opinion dated Jun. 15, 2020", International PCT Patent Application No. PCT/US2020/017023 , (13 pages).
"International Search Report and Written Opinion dated Oct. 16, 2019", International PCT Patent Application No. PCT/US19/43097 , (10 pages).
"International Search Report and Written Opinion dated Oct. 16, 2019", International PCT Patent Application No. PCT/US19/36275 , (10 pages).
"International Search Report and Written Opinion dated Oct. 16, 2019", International PCT Patent Application No. PCT/US19/43099 , (9 pages).
"International Search Report and Written Opinion dated Jun. 17, 2016", International PCT Patent Application No. PCT/FI2016/050172 , (9 pages).
"International Search Report and Written Opinion dated Feb. 2, 2021", International PCT Patent Application No. PCT/US20/60550 , (9 pages).

(56) References Cited

OTHER PUBLICATIONS

"International Search Report and Written Opinion dated Oct. 22, 2019", International PCT Patent Application No. PCT/US19/43751 , (9 pages).
"International Search Report and Written Opinion dated Dec. 23, 2019", International PCT Patent Application No. PCT/US19/44953 , (11 pages).
"International Search Report and Written Opinion dated May 23, 2019", International PCT Patent Application No. PCT/US18/66514 , (17 pages).
"International Search Report and Written Opinion dated Sep. 26, 2019", International PCT Patent Application No. PCT/US19/40544 , (12 pages).
"International Search Report and Written Opinion dated Aug. 27, 2019", International PCT Application No. PCT/US2019/035245 , (8 pages).
"International Search Report and Written Opinion dated Dec. 27, 2019", International Application No. PCT/US19/47746 , (16 pages).
"International Search Report and Written Opinion dated Dec. 3, 2020", International Patent Application No. PCT/US20/43596 , (25 pages).
"International Search Report and Written Opinion dated Sep. 30, 2019", International Patent Application No. PCT/US19/40324 , (7 pages).
"International Search Report and Written Opinion dated Sep. 4, 2020", International Patent Application No. PCT/US20/31036 , (13 pages).
"International Search Report and Written Opinion dated Jun. 5, 2020", International Patent Application No. PCT/US20/19871 , (9 pages).
"International Search Report and Written Opinion dated Aug. 8, 2019", International PCT Patent Application No. PCT/US2019/034763 , (8 pages).
"International Search Report and Written Opinion dated Oct. 8, 2019", International PCT Patent Application No. PCT/US19/41151 , (7 pages).
"International Search Report and Written Opinion dated Jan. 9, 2020", International Application No. PCT/US19/55185 , (10 pages).
"International Search Report and Written Opinion dated Feb. 28, 2019", International Patent Application No. PCT/US18/64686 , (8 pages).
"International Search Report and Written Opinion dated Feb. 7, 2020", International PCT Patent Application No. PCT/US2019/061265 , (11 pages).
"International Search Report and Written Opinion dated Jun. 11, 2019", International PCT Application No. PCT/US19/22620 , (7 pages).
"Invitation to Pay Additional Fees dated Aug. 15, 2019", International PCT Patent Application No. PCT/US19/36275 , (2 pages).
"Invitation to Pay Additional Fees dated Sep. 24, 2020", International Patent Application No. PCT/US2020/043596 , (3 pages).
"Invitation to Pay Additional Fees dated Oct. 22, 2019", International PCT Patent Application No. PCT/US19/47746 , (2 pages).
"Invitation to Pay Additional Fees dated Apr. 3, 2020", International Patent Application No. PCT/US20/17023 , (2 pages).
"Invitation to Pay Additional Fees dated Oct. 17, 2019", International PCT Patent Application No. PCT/US19/44953 , (2 pages).
"Multi-core processor", TechTarget , 2013 , (1 page).
"Non Final Office Action dated Apr. 1, 2022", U.S. Appl. No. 17/256,961 , (65 pages).
"Non Final Office Action dated Apr. 11, 2022", U.S. Appl. No. 16/938,782 , (52 pages).
"Non Final Office Action dated Apr. 12, 2022", U.S. Appl. No. 17/262,991 , (60 pages).
"Non Final Office Action dated Aug. 21, 2019", U.S. Appl. No. 15/564,517 , (14 pages).
"Non Final Office Action dated Aug. 4, 2021", U.S. Appl. No. 16/864,721 , (21 pages).
"Non Final Office Action dated Dec. 7, 2022", U.S. Appl. No. 17/357,795 , (63 pages).
"Non Final Office Action dated Feb. 2, 2022", U.S. Appl. No. 16/783,866 , (8 pages).
"Non Final Office Action dated Jan. 26, 2021", U.S. Appl. No. 16/928,313 , (33 pages).
"Non Final Office Action dated Jan. 27, 2021", U.S. Appl. No. 16/225,961 , (15 pages).
"Non Final Office Action dated Jul. 26, 2022", U.S. Appl. No. 17/098,059 , (28 pages).
"Non Final Office Action dated Jul. 27, 2020", U.S. Appl. No. 16/435,933 , (16 pages).
"Non Final Office Action dated Jul. 9, 2021", U.S. Appl. No. 17/002,663 , (43 pages).
"Non Final Office Action dated Jul. 9, 2021", U.S. Appl. No. 16/833,093 , (47 pages).
"Non Final Office Action dated Jun. 10, 2021", U.S. Appl. No. 16/938,782 , (40 Pages).
"Non Final Office Action dated Jun. 17, 2020", U.S. Appl. No. 16/682,911 , (22 pages).
"Non Final Office Action dated Jun. 19, 2020", U.S. Appl. No. 16/225,961 , (35 pages).
"Non Final Office Action dated Jun. 29, 2021", U.S. Appl. No. 16/698,588 , (58 pages).
"Non Final Office Action dated Mar. 3, 2021", U.S. Appl. No. 16/427,337 , (41 pages).
"Non Final Office Action dated Mar. 31, 2022", U.S. Appl. No. 17/257,814 , (60 pages).
"Non Final Office Action dated Mar. 9, 2022", U.S. Appl. No. 16/870,676 (57 pages).
"Non Final Office Action dated May 10, 2022", U.S. Appl. No. 17/140,921 , (25 pages).
"Non Final Office Action dated May 17, 2022", U.S. Appl. No. 16/748,193 (11 pages).
"Non Final Office Action dated May 26, 2021", U.S. Appl. No. 16/214,575 , (19 pages).
"Non Final Office Action dated Nov. 5, 2020", U.S. Appl. No. 16/530,776 , (45 pages).
"Non Final Office Action dated Sep. 1, 2020", U.S. Appl. No. 16/214,575 , (40 pages).
"Non Final Office Action dated Sep. 19, 2022", U.S. Appl. No. 17/263,001 , (14 pages).
"Non Final Office Action dated Sep. 20, 2021", U.S. Appl. No. 17/105,848 , (56 pages).
"Non Final Office Action dated Sep. 29, 2021", U.S. Appl. No. 16/748,193 , (62 pages).
"Notice of Allowance dated Mar. 25, 2020", U.S. Appl. No. 15/564,517 , (11 pages).
"Notice of Allowance dated Oct. 5, 2020", U.S. Appl. No. 16/682,911 , (27 pages).
"Notice of Reason for Rejection dated Oct. 28, 2022 with English translation", Japanese Patent Application No. 2020-531452 , (3 pages).
"Notice of Reason of Refusal dated Sep. 11, 2020 with English translation", Japanese Patent Application No. 2019-140435 , (6 pages).
"Office Action dated Nov. 24, 2022 with English Translation", Japanese Patent Application No. 2020-533730 , (11 pages).
"Phototourism Challenge", CVPR 2019 Image Matching Workshop. https://image matching-workshop. github.io. , (16 pages).
"Second Office Action dated Jul. 13, 2022 with English Translation", Chinese Patent Application No. 201880079474.6 , (10 pages).
"Second Office Action dated Jun. 20, 2022 with English Translation", Chinese Patent Application No. 201880089255.6 , (14 pages).
"Summons to attend oral proceedings pursuant to Rule 115(1) EPC mailed on Jul. 15, 2019", European Patent Application No. 15162521.7 , (7 pages).
Aarik, J. , et al. , "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351 ?via%3Dihub>; DOI: 10.1016/S0040-6090(97)00135-1; see entire document , (2 pages).
Altwaijry , et al. , "Learning to Detect and Match Keypoints with Deep Architectures", Proceedings of the British Machine Vision

(56) References Cited

OTHER PUBLICATIONS

Conference (BMVC), BMVA Press, Sep. 2016, [retrieved on Jan. 8, 2021 (Jan. 1, 2021 )] < URL: http://www.bmva.org/bmvc/2016/papers/paper049/index.html >, en lire document, especially Abstract.
Anonymous , "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022).
Arandjelović, Relja , et al. , "Three things everyone should know to improve object retrieval", CVPR, 2012 , (8 pages).
AZOM , "Silica—Silicon Dioxide (SiO2)" , AZO Materials; Publication [Online]. Dec. 13, 2001 [retrieved Feb. 19, 2020]. Retrieved from the Internet: <URL: https://www.azom.com/article.aspx?ArticleID=1114>.
Azuma, Ronald T. , "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995 , 262 pages.
Battaglia, Peter W, et al. , "Relational inductive biases, deep learning, and graph networks", arXiv:1806.01261, Oct. 17, 2018 , pp. 1-40.
Berg, Alexander C , et al. , "Shape matching and object recognition using low distortion correspondences", In CVPR, 2005 , (8 pages).
Bian, Jiawang , et al. , "GMS: Grid-based motion statistics for fast, ultra-robust feature correspondence.", In CVPR (Conference on Computer Vision and Pattern Recognition), 2017 , (10 pages).
Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007) , (393 pages).
Brachmann, Eric , et al. , "Neural-Guided RANSAC: Learning Where to Sample Model Hypotheses", In ICCV (International Conference on Computer Vision ), arXiv:1905.04132v2 [cs.CV] Jul. 31, 2019 , (17 pages).
Butail , et al. , "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tibério S , et al. , "Learning graph matching", IEEE TPAMI, 31(6):1048-1058, 2009.
Cech, Jan , et al. , "Efficient sequential correspondence selection by cosegmentation", IEEE TPAMI, 32(9):1568-1581, Sep. 2010.
Chittineni, C. , et al. , "Single filters for combined image geometric manipulation and enhancement", Proceedings of SPIE vol. 1903, Image and Video Processing, Apr. 8, 1993, San Jose, CA. (Year: 1993) , pp. 111-121.
Cuturi, Marco , "Sinkhorn distances: Lightspeed computation of optimal transport", NIPS, 2013 , (9 pages).
Dai, Angela , et al. , "ScanNet: Richly-annotated 3d reconstructions of indoor scenes", In CVPR, arXiv:1702.04405v2 [cs.CV] Apr. 11, 2017 , (22 pages).
Deng, Haowen , et al. , "PPFnet: Global context aware local features for robust 3d point matching", In CVPR, arXiv:1802.02669v2 [cs.CV] Mar. 1, 2018 , (12 pages).
Detone, Daniel , et al. , "Deep image homography estimation", In RSS Work-shop: Limits and Potentials of Deep Learning in Robotics, arXiv:1606.03798v1 [cs.CV] Jun. 13, 2016 , (6 pages).
Detone, Daniel , et al. , "Self-improving visual odometry", arXiv:1812.03245, Dec. 8, 2018 , (9 pages).
Detone, Daniel , et al. , "SuperPoint: Self-supervised interest point detection and description", In CVPR Workshop on Deep Learning for Visual SLAM, arXiv:1712.07629v4 [cs.CV] Apr. 19, 2018 , (13 pages).
Dusmanu, Mihai , et al. , "D2-net: A trainable CNN for joint detection and description of local features", CVPR, arXiv:1905.03561v1 [cs.CV] May 9, 2019 , (16 pages).

Ebel, Patrick , et al. , "Beyond cartesian representations for local descriptors", ICCV, arXiv:1908.05547v1 [cs.CV] Aug. 15, 2019 , (11 pages).
Fischler, Martin A , et al. , "Random sample consensus: a paradigm for model fitting with applications to image analysis and automated cartography", Communications of the ACM, 24(6): 1981 , pp. 381-395.
Gilmer, Justin , et al. , "Neural message passing for quantum chemistry", In ICML, arXiv:1704.01212v2 [cs.LG] Jun. 12, 2017 , (14 pages).
Giuseppe, Donato , et al. , "Stereoscopic helmet mounted system for real time 3D environment reconstruction and indoor ego—motion estimation", Proc. SPIE 6955, Head- and Helmet-Mounted Displays XIII: Design and Applications, SPIE Defense and Security Symposium, 2008, Orlando, Florida, United States , 69550P.
Goodfellow , "Titanium Dioxide—Titania (TiO2)" , AZO Materials; Publication [online]. Jan. 11, 2002 [retrieved Feb. 19, 2020]. Retrieved from the Internet: <URL: https://www.azom.com/article.aspx?ArticleID=1179>.
Hartley, Richard , et al. , "Multiple View Geometry in Computer Vision", Cambridge University Press, 2003 , pp. 1-673.
Jacob, Robert J.K. , "Eye Tracking in Advanced Interface Design", Human-Computer Interaction Lab, Naval Research Laboratory, Washington, D.C., date unknown. 2003 , pp. 1-50.
Lee , et al. , "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082 >, entire document.
Lee, Juho , et al. , "Set transformer: A frame-work for attention-based permutation-invariant neural networks", ICML, arXiv:1810.00825v3 [cs.LG] May 26, 2019 , (17 pages).
Leordeanu, Marius , et al. , "A spectral technique for correspondence problems using pairwise constraints", Proceedings of (ICCV) International Conference on Computer Vision, vol. 2, pp. 1482-1489, Oct. 2005 , (8 pages).
Levola, T. , "Diffractive Optics for Virtual Reality Displays", Journal of the SID Eurodisplay 14/05, 2005, XP008093627, chapters 2-3, Figures 2 and 10 , pp. 467-475.
Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3 , pp. 64-67.
Li, Yujia , et al. , "Graph matching networks for learning the similarity of graph structured objects", ICML, arXiv:1904.12787v2 [cs.LG] May 12, 2019 , (18 pages).
Li, Zhengqi , et al. , "Megadepth: Learning single- view depth prediction from internet photos", In CVPR, fromarXiv: 1804.00607v4 [cs.CV] Nov. 28, 2018 , (10 pages).
Libovicky , et al. , "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.
Loiola, Eliane Maria, et al. , "A survey for the quadratic assignment problem", European journal of operational research, 176(2): 2007 , pp. 657-690.
Lowe, David G , "Distinctive image features from scale-invariant keypoints", International Journal of Computer Vision, 60(2): 91-110, 2004 , (28 pages).
Luo, Zixin , et al. , "ContextDesc: Local descriptor augmentation with cross-modality context", CVPR, arXiv:1904.04084v1 [cs.CV] Apr. 8, 2019 , (14 pages).
Memon, F. , et al. , "Synthesis, Characterization and Optical Constants of Silicon Oxycarbide", EPJ Web of Conferences; Publication [online). Mar. 23, 2017 [retrieved Feb. 19, 2020).<URL: https://www.epj-conferences.org/articles/epjconf/pdf/2017/08/epjconf_nanop2017 _00002.pdf>; DOI: 10.1051/epjconf/201713900002 , (8 pages).
Molchanov, Pavlo , et al. , "Short-range FMCW monopulse radar for hand-gesture sensing", 2015 IEEE Radar Conference (RadarCon) (2015) , pp. 1491-1496.

(56) References Cited

OTHER PUBLICATIONS

Mrad, et al., "A framework for System Level Low Power Design Space Exploration", 1991.
Munkres, James, "Algorithms for the assignment and transportation problems", Journal of the Society for Industrial and Applied Mathematics, 5(1): 1957, pp. 32-38.
Ono, Yuki, et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam, et al., "Automatic differentiation in Pytorch", 31st Conference on Neural Information Processing Systems (NIPS 2017), Long Beach, CA, USA, (4 pages).
Peyré, Gabriel, et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al., "Pointnet++: Deep hierarchical feature learning on point sets in a metric space.", 31st Conference on Neural Information Processing Systems (NIPS 2017), Long Beach, CA, USA., Jun. 7, 2017, (10 pages).
Qi, Charles R, et al., "Pointnet: Deep Learning on Point Sets for 3D Classification and Segmentation", CVPR, arXiv:1612.00593v2 [cs.CV] Apr. 10, 2017, (19 pages).
Radenović, Filip, et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul, et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René, et al., "Deep fundamental matrix estimation", European Conference on Computer Vision (ECCV), 2018, (17 pages).
Revaud, Jerome, et al., "R2D2: Repeatable and Reliable Detector and Descriptor", In NeurIPS, arXiv:1906.06195v2 [cs.CV] Jun. 17, 2019, (12 pages).
Rocco, Ignacio, et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan, et al., "ORB: An efficient alternative to SIFT or SURF", Proceedings of the IEEE International Conference on Computer Vision. 2564-2571. 2011; 10.1109/ICCV.2011.612654, (9 pages).
Sarlin, et al., "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.
Sattler, Torsten, et al., "SCRAMSAC: Improving RANSAC's efficiency with a spatial consistency filter", ICCV, 2009: 2090-2097., (8 pages).
Schonberger, Johannes Lutz, et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes Lutz, et al., "Structure-from-motion revisited", Proceedings of the IEEE Conference on Computer Vision and Pattern Recognition (CVPR), 2016, pp. 4104-4113, (11 pages).
Sheng, Liu, et al., "Time-multiplexed dual-focal plane head-mounted display with a liquid lens", Optics Letters, Optical Society of Amer i ca, US, vol. 34, No. 11, Jun. 1, 2009 (Jun. 1, 2009), XP001524475, ISSN: 0146-9592, pp. 1642-1644.
Sinkhorn, Richard, et al., "Concerning nonnegative matrices and doubly stochastic matrices.", Pacific Journal of Mathematics, 1967, pp. 343-348.
Spencer, T., et al., "Decomposition of poly(propylene carbonate) with UV sensitive iodonium 11 salts", Polymer Degradation and Stability; (online]. Dec. 24, 2010 (retrieved Feb. 19, 2020]., (17 pages).
Tanriverdi, Vildan, et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart, et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo, et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne, et al., "Wide baseline stereo matching based on local, affinely invariant regions", BMVC, 2000, pp. 1-14.
Ulyanov, Dmitry, et al., "Instance normalization: The missing ingredient for fast stylization", arXiv:1607.08022v3 [cs.CV] Nov. 6, 2017, (6 pages).
Vaswani, Ashish, et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar, et al., "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.
Wang, Xiaolong, et al., "Non-local neural networks", CVPR, arXiv:1711.07971v3 [cs.CV] Apr. 13, 2018, (10 pages).
Wang, Yue, et al., "Deep Closest Point: Learning representations for point cloud registration", ICCV, arXiv:1905.03304v1 [cs.CV] May 8, 2019, (10 pages).
Wang, Yue, et al., "Dynamic Graph CNN for learning on point clouds", ACM Transactions on Graphics, arXiv:1801.07829v2 [cs.CV] Jun. 11, 2019, (13 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al., "Learning to find good correspondences", CVPR, arXiv:1711.05971v2 [cs.CV] May 21, 2018, (13 pages).
Yi, Kwang Moo, et al., "Lift: Learned invariant feature transform", ECCV, arXiv:1603.09114v2 [cs.CV] Jul. 29, 2016, (16 pages).
Zaheer, Manzil, et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui, et al., "Learning two-view correspondences and geometry using order-aware network", ICCV; aarXiv:1908.04964v1 [cs.CV] Aug. 14, 2019, (11 pages).
Zhang, Li, et al., "Dual graph convolutional net-work for semantic segmentation", BMVC, 2019; arXiv:1909.06121v3 [cs.CV] Aug. 26, 2020, (18 pages).
"Extended European Search Report dated Dec. 14, 2022", European Patent Application No. 20886547.7, (8 pages).
"Extended European Search Report dated Jul. 20, 2022", European Patent Application No. 19885958.9, (9 pages).
"Final Office Action dated Dec. 29, 2022", U.S. Appl. No. 17/098,059, (32 pages).
"First Office Action dated Feb. 11, 2022 with English translation", Chinese Patent Application No. 201880089255.6, (17 pages).
"Non Final Office Action dated Feb. 3, 2023", U.S. Appl. No. 17/429,100, (16 pages).
"Non Final Office Action dated Feb. 3, 2023", U.S. Appl. No. 17/497,965, (32 pages).
"Non Final Office Action dated Jan. 24, 2023", U.S. Appl. No. 17/497,940, (10 pages).
"Communication Pursuant to Article 94(3) EPC dated Feb. 28, 2023", European Patent Application No. 19845418.3, (6 Pages).
"Communication Pursuant to Article 94(3) EPC dated Jul. 28, 2023", European Patent Application No. 19843487.0, (15 pages).
"Communication Pursuant to Article 94(3) EPC dated May 23, 2023", European Patent Application No. 18890390.0, (5 pages).

(56) References Cited

OTHER PUBLICATIONS

"Communication Pursuant to Article 94(3) EPC dated Oct. 6, 2023", European Patent Application No. 19851373.1 , (6 pages).
"Communication Pursuant to Rule 164(1) EPC dated Feb. 23, 2022", European Patent Application No. 20753144.3 , (11 pages).
"Decision of Rejection dated Jan. 5, 2023 with English translation", Chinese Patent Application No. 201880079474.6 , (10 pages).
"Extended European Search Report dated Jan. 8, 2024", European Patent Application No. 23195266.4 , (8 pages).
"Extended European Search Report dated Apr. 5, 2023", European Patent Application No. 20888716.6 , (11 pages).
"Final Office Action dated Oct. 16, 2023", U.S. Appl. No. 17/098,043 , (7 pages).
"Final Office Action dated Dec. 1, 2023", U.S. Appl. No. 17/357,795 , (18 pages).
"Final Office Action dated Mar. 10, 2023", U.S. Appl. No. 17/357,795 , (15 pages).
"Final Office Action dated Sep. 8, 2023 with English translation", Japanese Patent Application No. 2020-566620 , (18 pages).
"First Examination Report dated Aug. 8, 2023", Australian Patent Application No. 2018379105 , (3 pages).
"First Office Action dated Apr. 21, 2023 with English translation", Japanese Patent Application No. 2021-509779 , (26 pages).
"First Office Action dated Dec. 12, 2023 with English translation", Japanese Patent Application No. 2021-545712 , (8 pages).
"First Office Action dated Jul. 4, 2023 with English translation", Japanese Patent Application No. 2021-505669 , (6 pages).
"First Office Action dated Nov. 2, 2023 with English translation", Chinese Patent Application No. 201980090867.1 , (16 pages).
"First Office Action dated Apr. 13, 2023 with English Translation", Japanese Patent Application No. 2020-567766 , (7 pages).
"First Office Action dated Dec. 22, 2022 with English translation", Chinese Patent Application No. 201980061450.2 , (11 pages).
"First Office Action dated Jan. 24, 2023 with English translation", Japanese Patent Application No. 2020-549034 , (7 pages).
"First Office Action dated Jan. 30, 2023 with English translation", Chinese Patent Application No. 201980082951.9 , (5 pages).
"First Office Action dated Jun. 13, 2023 with English translation", Japanese Patent Application No. 2020-567853 , (7 pages).
"First Office Action dated Mar. 27, 2023 with English translation", Japanese Patent Application No. 2020-566617 , (6 pages).
"First Office Action dated Mar. 6, 2023 with English translation", Korean Patent Application No. 10-2020-7019685 , (7 pages).
"First Office Action dated May 26, 2023 with English translation", Japanese Patent Application No. 2021-500607 , (6 pages).
"First Office Action dated May 30, 2023 with English translation", Japanese Patent Application No. 2021-519873 , (8 pages).
"First Office Action dated Sep. 29, 2023 with English translation", Japanese Patent Application No. 2023-10887 , (5 pages).
"Non Final Office Action dated Nov. 19. 2019", U.S. Appl. No. 16/355,611 , (31 pages).
"Non Final Office Action dated Apr. 13, 2023", U.S. Appl. No. 17/098,043 , (7 pages).
"Non Final Office Action dated Aug. 2, 2023", U.S. Appl. No. 17/807,600 , (25 pages).
"Non Final Office Action dated Jul. 20, 2023", U.S. Appl. No. 17/650,188 , (11 pages).
"Non Final Office Action dated Jun. 14, 2023", U.S. Appl. No. 17/516,483 , (10 pages).
"Non Final Office Action dated Mar. 1, 2023", U.S. Appl. No. 18/046,739 , (34 pages).
"Non Final Office Action dated May 11, 2023", U.S. Appl. No. 17/822,279 , (24 pages).
"Non Final Office Action dated Nov. 22, 2023", U.S. Appl. No. 17/268,376 , (8 pages).
"Non Final Office Action dated Nov. 3, 2023", U.S. Appl. No. 17/416,248 , (17 pages).
"Non Final Office Action dated Oct. 24, 2023", U.S. Appl. No. 17/259,020 , (21 pages).
"Notice of Allowance dated Jul. 27, 2023 with English translation", Korean Patent Application No. 10-2020-7019685 , (4 pages).
"Office Action dated Nov. 21, 2023 with English Translation", Japanese Patent Application No. 2021-535716 , (15 pages).
"Office Action dated Apr. 13, 2023 with English translation", Japanese Patent Application No. 2020-533730 , (13 pages).
"Office Action dated Dec. 14, 2023 with English translation", Japanese Patent Application No. 2021-526564 , (13 pages).
"Office Action dated Jul. 20, 2023 with English translation", Japanese Patent Application No. 2021-505884 , (6 pages).
"Office Action dated Jun. 8, 2023 with English translation", Japanese Patent Application No. 2021-503762 , (6 pages).
"Office Action dated Mar. 30, 2023 with English translation", Japanese Patent Application No. 2020-566620 , (10 pages).
"Office Action dated Nov. 7, 2023 with English translation", Korean Patent Application No. 10-2023-7036734 , (5 pages).
"Penultimate Office Action dated Oct. 19, 2023 with English translation", Japanese Patent Application No. 2021-509779 , (5 pages).
"Second Office Action dated May 2, 2023 with English Translation", Japanese Patent Application No. 2020-549034 , (6 pages).
"Second Office Action dated Sep. 25, 2023 with English translation", Japanese Patent Application No. 2020-567853 , (8 pages).
"Wikipedia Dioptre", Jun. 22, 2018 (Jun. 22, 2018), XP093066995, Retrieved from the Internet: URL:https://en.wikipedia.org/w/index.php?title=Dioptre&direction=next&oldid=846451540 [retrieved on Jul. 25, 2023] , (3 pages).
Li, Yujia , et al. , "Graph Matching Networks for Learning the Similarity of Graph Structured Objects", arxiv.org, Cornell University Library, 201 Olin Library Cornell University Ithaca, NY 14853, XP081268608.
Luo, Zixin , et al. , "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020] , pp. 2522-2531.
Zhang, Zen , et al. , "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020] , pp. 5086-5095.
"First Office Action mailed Dec. 20, 2023 with English translation", Chinese Patent Application No. 201980050600.X, (21 pages).
"First Office Action mailed Dec. 27, 2023 with English translation", Chinese Patent Application No. 201980075942.7, (7 pages).
"Office Action mailed on Nov. 8, 2023 with English translation", Chinese Patent Application No. 201980060018.1, (12 pages).
"Communication Pursuant to Article 94(3) EPC mailed on Feb. 21, 2024", European Patent Application No. 20770244.0, (8 pages).
"First Office Action mailed Mar. 1, 2024 with English translation", Japanese Patent Application No. 2021-553297, (5 pages).
"First Office Action mailed on Feb. 1, 2024 with English translation", Chinese Patent Application No. 202080018865.4, (9 pages).
"Non Final Office Action mailed on Feb. 26, 2024", U.S. Appl. No. 18/046,739, (48 pages).
"Office Action mailed on Feb. 19, 2024 with English translation", Korean Patent Application No. 10-2020-7020552, (18 pages).
"Office Action mailed on Feb. 26, 2024 with English translation", Chinese Patent Application No. 201980069194.1, (11 pages).
"Office Action mailed on Mar. 6, 2024 with English translation", Chinese Patent Application No. 201980053016.X, (7 pages).

* cited by examiner

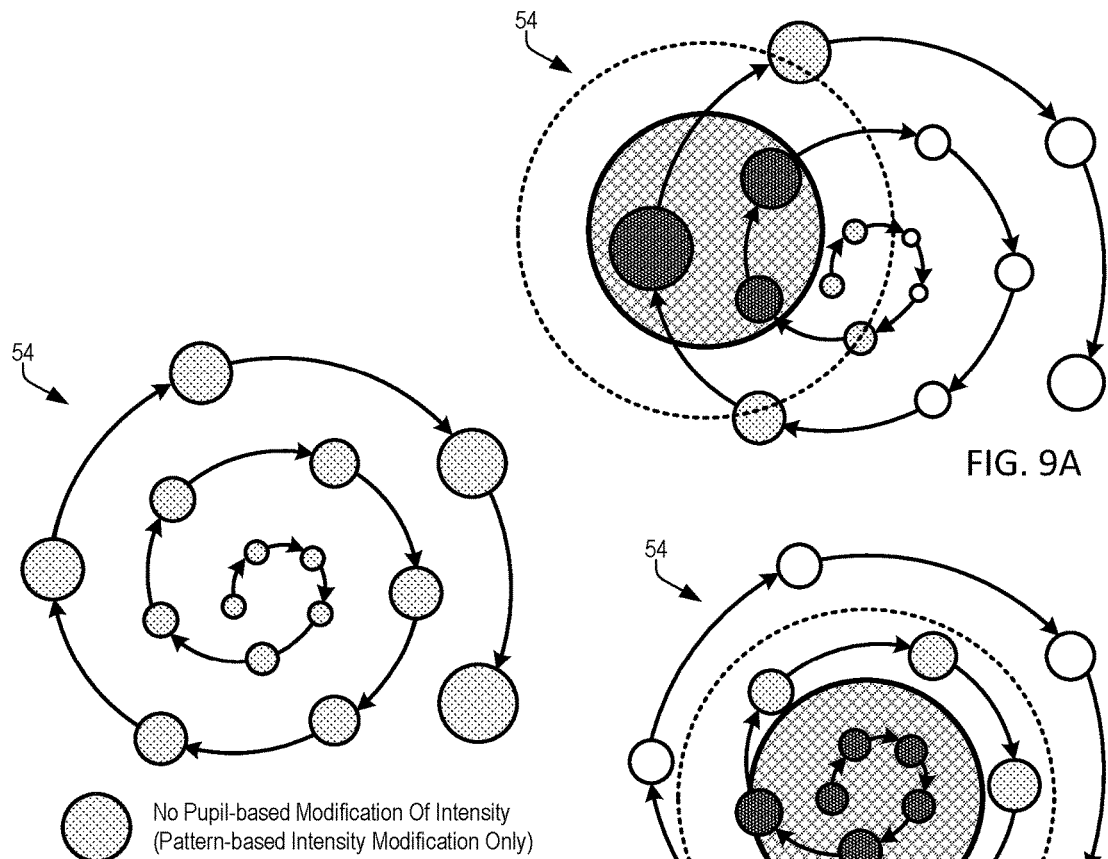
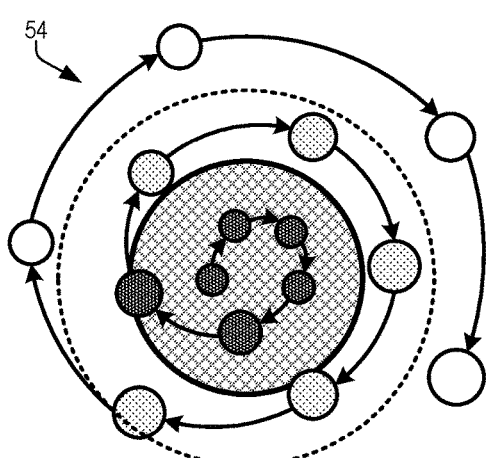
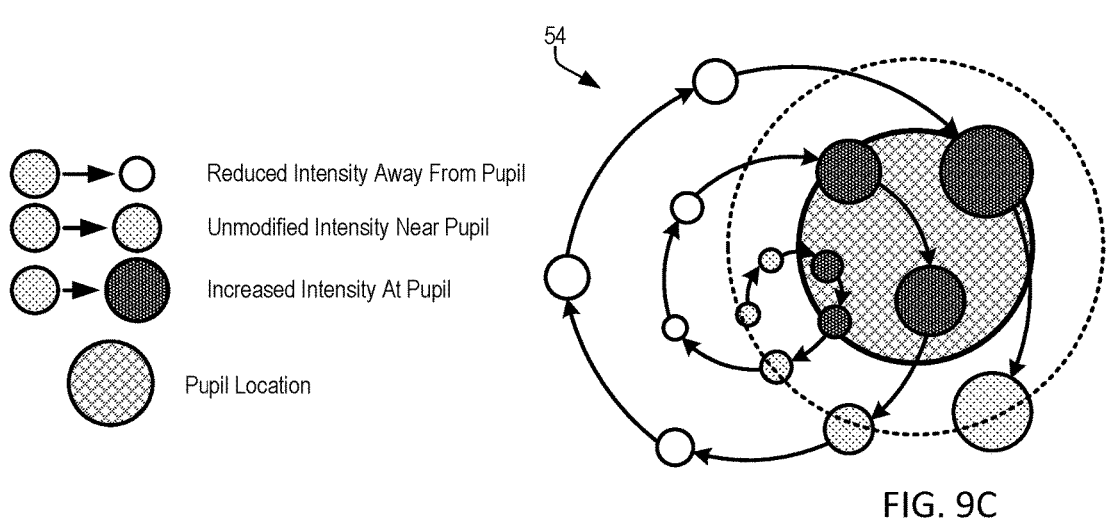
FIG. 8
FIG. 9A
FIG. 9B
FIG. 9C

PIXEL INTENSITY MODULATION USING MODIFYING GAIN VALUES

CROSS-REFERENCE TO RELATED APPLICATIONS

This application is a continuation of U.S. patent application Ser. No. 17/256,961, filed on Dec. 29, 2020, which is a National Phase of International Patent Application No: PCT/US2019/040324, filed on Jul. 2, 2019, which claims priority from U.S. Provisional Patent Application No. 62/693,228, filed on Jul. 2, 2018, all of which are incorporated herein by reference in their entirety.

BACKGROUND OF THE INVENTION

1). Field of the Invention

This invention relates to a visual perception device and to a method of creating an image.

2). Discussion of Related Art

Visual perception devices that provide a rendered image have become popular for computing, entertainment and other purposes. A visual perception device is usually a wearable device with a display for rendering the image.

SUMMARY OF THE INVENTION

The invention provides a visual perception device including a data store, relational gain data stored in the data store and representing a plurality of reference locations and a plurality of gain values, each gain value corresponding to a respective reference location, a video data receiver connectable to a video data channel to receive video data including a plurality of pixels, a correlator connected to the relational gain data and the video data receiver and operable to correlate each pixel with a reference location in the relational gain data to find a gain value corresponding to the respective pixel, a beam modulator connected to the video data receiver and the correlator and operable to modify an intensity value of the respective pixel based on the gain value for the respective pixel to determine a modulated intensity value for the respective pixel and a laser projector connected to the beam modulator and operable to generate a respective beam of light corresponding to the modulated intensity value of each respective pixel and transmit the beams of light in a pattern wherein the beams of light are spatially separated.

The invention also provides a method of creating an image including storing relational gain data representing a plurality of reference locations and a plurality of gain values, each gain value corresponding to a respective reference location, receiving video data including a plurality of pixels over a video data channel, correlating each pixel with a reference location in the relational gain data to find a gain value corresponding to the respective pixel, modifying an intensity value of the respective pixel based on the gain value for the respective pixel to determine a modulated intensity value for the respective pixel, generating a respective beam of light corresponding to the modulated intensity value of each respective pixel and transmitting the beams of light in a pattern wherein the beams of light are spatially separated.

BRIEF DESCRIPTION OF THE DRAWINGS

The invention is further described by way of examples with reference to the accompanying drawings, wherein:

FIG. 8 is a view of the pattern with no intensity modifications due to pupil location;

FIGS. 9A to 9C illustrate intensity modifications due to pupil location;

DETAILED DESCRIPTION OF THE INVENTION

A data entry in video data is referred to herein as a "pixel". The term "pixel" is also used to refer to one location in a two-dimensional pattern where light is created for display to a user. The data entry in the video data includes an intensity value that influences an intensity of the light in the two-dimensional pattern. The term "pixel" is also sometimes used to refer to a particular transformation that happens at a moment in time between when the "pixel" is in the video data and when the "pixel" refers to light in the two-dimensional pattern. In other instances, for example when the video data is used to generate laser light, the term "pixel" may not be used because the focus of the description may be on other aspects such as the functioning of one or more lasers or other light sources.

"Intensity" is used herein to refer to the power coming from a single pixel. "Brightness" is used to refer to the power of multiple pixels, or regions of the viewable image as seen by a user, and depends at least in part on the density of the pixels. In some embodiments, other factors such as relay optics design, environmental lighting conditions, background scene colors and patterns can affect perceived brightness or brightness uniformity of an image. Although more "intensity" of individual pixels will result in more overall brightness over an area, it will be more understandable herein to exclude "intensity" of individual pixels from the definition of "brightness". As such, "brightness" will be primarily discussed in the context of areas that are brighter or darker due differences in pixel density.

Figure 1:
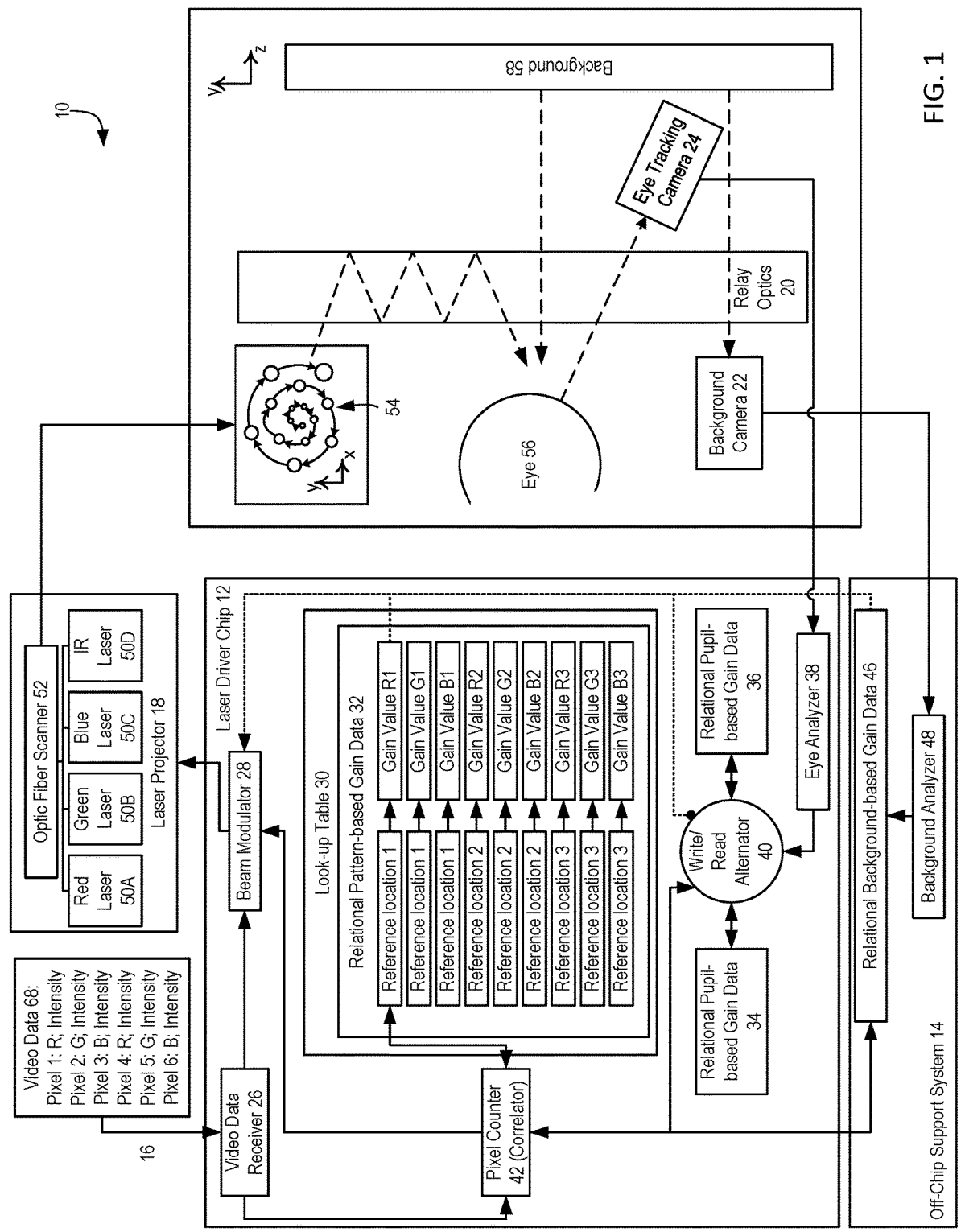
FIG. 1 is a diagram that is partially in block diagram form and partially in illustrative form showing a visual perception device according to an embodiment of the invention.

FIG. 1 of the accompanying drawings illustrates a visual perception device 10, according to an embodiment of the invention, including a laser driver chip 12, an off-chip support system 14, a video data channel 16, a laser projector 18, relay optics 20, at least one background camera 22, and at least one eye tracking camera 24.

The laser driver chip 12 includes a video data receiver 26, a beam modulator 28, a look-up table 30 holding relational pattern-based gain data 32, further look-up tables holding relational pupil-based gain data 34 and 36, an eye analyzer 38, a write/read alternator 40, and a correlator in the form of a pixel counter 42.

The video data receiver 26 is connected to the video data channel 16. The beam modulator 28 is connected to the video data receiver 26 and provides an output to the laser projector 18.

The relational pattern-based gain data 32 includes a plurality of reference locations and corresponding gain values. Each reference location corresponds to a particular position of a pattern that is inherent in the functioning of a fiber scanner of the laser projector 18. Each reference location includes gain values for a plurality of colors, in the present example for red, green and for blue. The pixel counter 42 is connected to the video data receiver 26 and to the look-up table 30. The beam modulator 28 is connected to the look-up table 30 and the pixel counter 42.

The relational pupil-based modifying data 34 and 36 are connected to the write/read alternator 40. The write/read alternator 40 is connected to the pixel counter 42 and provides an output to the beam modulator 28. The write/read alternator 40 is connected to the eye analyzer 38 to receive an input from the eye analyzer 38.

The off-chip support system 14 includes a table holding relational background-based gain data 46 and a background analyzer 48. The relational background-based gain data 46 is connected to the pixel counter 42. The background analyzer 48 is connected to the relational background-based gain data 46. The beam modulator 28 is connected to the relational background-based gain data 46.

The laser projector 18 includes a plurality of lasers, which can include including red, green, blue and infrared (IR) lasers 50A, 50B, 50C, and 50D, respectively. The laser projector 18 may activate the lasers 50A to 50D in a sequence based on the image data. For purposes of further discussion, a two-dimensional pattern that is created by one of the lasers, for example, the red laser 50A, is discussed. It will however be understood that each laser 50A to 50D will create a selected pattern, but in a different color. If the patterns for the different colors are the same, then it is likely that their intensity values may differ from color to color.

The laser projector 18 includes an optical fiber scanner 52 that is in communication with the lasers 50A to 50D. An actuator (not shown) may move the optical fiber scanner 52 in two dimensions according to a selected scan pattern. Light received by the optical fiber scanner 52 from the lasers 50A to 50D leaves the optical fiber scanner 52 and is projected to form a two-dimensional pattern 54. The laser light is passed through a lens system (not shown) to prepare it for injection into the image relay 20.

The present embodiment includes a laser projector 18 that generates laser light. Another embodiment may use a different system, for example a light emitting diode-based system, that may generate light other than laser light.

The laser projector 18, eye tracking camera 24, image relay 20 and background camera 22 are all mounted to a common frame and are thus stationary relative to one another. The frame can be worn by a person. The image relay 20 is then located in front of an eye 56 of the person. In the present example, the image relay 20 is a selectively transparent member. Light from a background 58 and objects in the background 58 transmits through the image relay 20 to the eye 56. The person can thus see the background 58 and the objects in the background 58 through the image relay 20. The image relay may be of the kind described in U.S. patent application Ser. No. 14/331,218, which is incorporated herein by reference.

The laser projector 18 is mounted in a position wherein the optical fiber scanner 52 is directed at the image relay 20. The optical fiber scanner 52 is actuated such that the output end follows a selected scan pattern and creates an image by projecting light along scan pattern to create the pattern 54 of projected light in an x-y plane. The image is projected either directly or through a lens system into the image relay 20. Light from the pattern 54 then transmits through a reflective path through the image relay 20 and exits the image relay 20 near the eye 56. Only one light path of one pixel is shown in a y-z plane although it should be understood that each dot, or pixel, in the pattern 54 travels in x-y-z dimensions before leaving the image relay 20. The pattern 54 that is created by the projection of light from optical fiber scanner 52 is the same pattern that makes up the virtual component of the total image received by a user's eye and is viewable by the eye 56 after the light leaves the image relay 20. The eye 56 thus receives real world light from the background 58 and light from the optical fiber scanner 52 via the image relay 20 simultaneously. An augmented reality system is provided wherein a scene of real world objects that the person sees in the background 58 is augmented with rendered content such as a two-dimensional or three-dimensional an image or a video created by light from the laser projector 18. In such a scene the rendered content may be displayed in a manner that gives the perception that rendered content is located on a real world object such as on a real world table or against a real world object such as against a real world wall, or may be displayed in a manner that gives the perception that the rendered content is floating in space in front of the scene of real world objects.

For purposes of explanation, all pixels in the given example have intensity values that are more than zero, although it will be understood that some pixels may have intensity values of zero so that no light is created for those pixels. While the pattern 54 shows pixels being projected over a majority of the field of view, it is possible to only project a limited number of pixels in a desired area of the pattern such that a virtual image smaller than the entire field of view that is projected toward the image relay 20.

The eye tracking camera 24 is mounted in a position to capture images of the eye 56. The eye tracking camera 24 may, for example, receive light from the eye 56. Alternatively, an infrared emitter may emit infrared light that is reflected by the eye 56 and is captured by the eye tracking camera 24. The eye analyzer 38 is connected to the eye tracking camera 24.

Light from the background 58 is captured by the background camera 22. The background camera 22 may, for example, have a detector that detects environmental light in two dimensions transmitted from the background 58. The background analyzer 48 is connected to the background camera 22.

Figure 2:
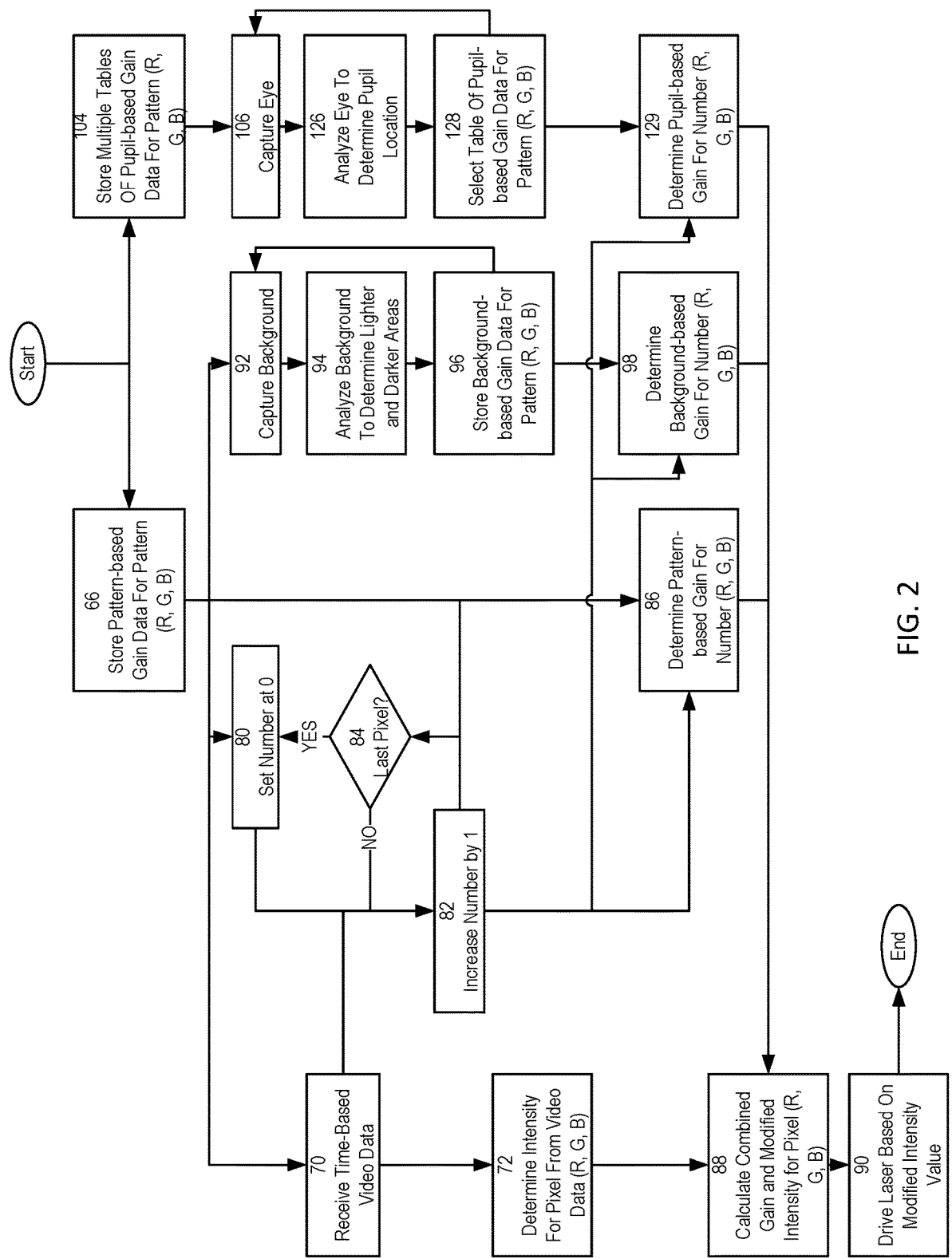
FIG. 2 is a flow chart illustrating a method of creating an image using the visual perception device.

In use, the look-up table 30 including the relational pattern-based gain data 32 is stored in a data store on the laser driver chip 12 (see also FIG. 2:66). The visual perception device 10 is fitted to a head of a person in a position wherein the eye 56 of the person views the background 58 through the image relay 20. The video data receiver 26 receives video data 68 through the video data channel 16 (70). The video data 68 includes a series of pixels that each include a color designation and a respective intensity value that the beam modulator uses to adjust the intensity of the light at the light source.

The beam modulator 28 determines the intensity for each color of a pixel from the video data 68) and provides the data to the laser projector 18. By way of example, the laser projector 18 activates the red laser 50A. The red laser 50A provides red laser light to the optical fiber scanner 52. When the laser light exits the optical fiber scanner 52, the laser light couples into the image relay 20, either directly or indirectly through relay optics, lenses, scanning mirrors, or folding mirrors, at a particular location that depends on the location of the optical fiber scanner 52 at that particular moment in time. The beam modulator 28 may provide green, blue and optionally IR pixel data, including color designation for each pixel, and intensity value to the laser projector 18 in the same way. The beam modulator 28 then provides the second red pixel and its corresponding intensity value to the laser projector. The red laser 50A then creates a red laser light and provides the red laser light to the optical fiber scanner 52. The red laser light leaves the optical fiber scanner 52 and couples into the image relay 20 at a different location than where the first red pixel coupled into the image relay 20. The red laser 50A is repeatedly activated while the optical fiber scanner 52 continues to move in two dimensions. Red laser light couples into the image relay 20 and creates the pattern 54, which is a two-dimensional pattern in an x-y plane. By way of example, the pattern 54 is created by actuating the optical fiber scanner 52 in a scan pattern. As shown, the scan pattern may include a spiral pattern that starts with a small circular shape and then continues to grow larger by increasing the scan radius over time over a two-dimensional area.

The respective beams of laser light of the pattern 54 couple into the image relay 20 at different angles then reflect within the image relay 20, whereafter the beams exit the image relay 20 and the same pattern 54 is viewable by the eye 56.

Figure 3:
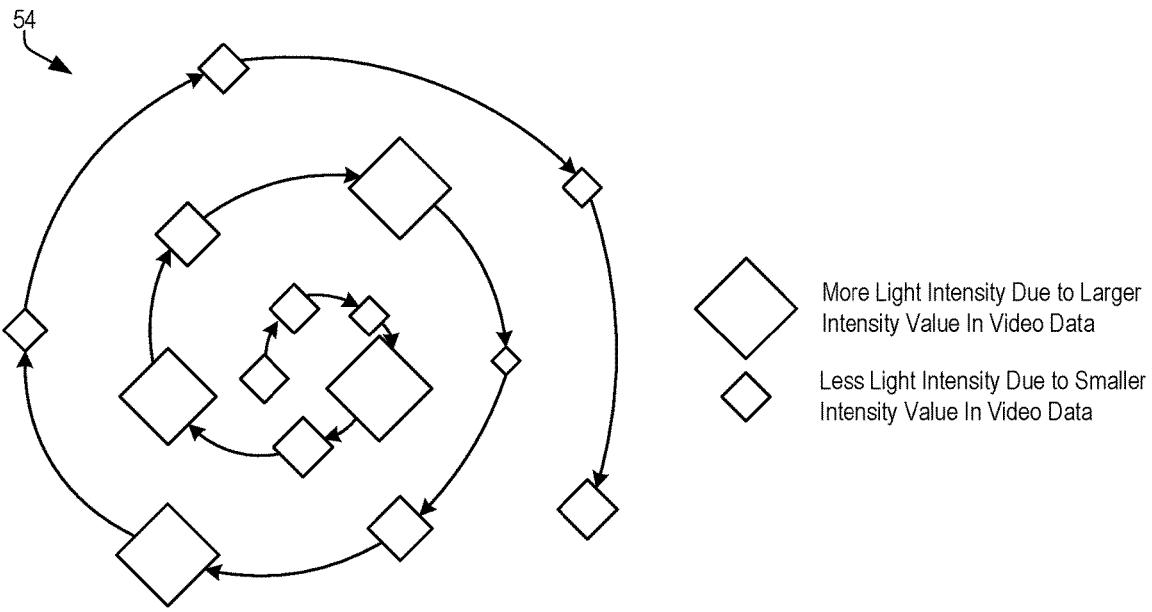
FIG. 3 is a view of a pattern that is created by an optical fiber scanner of the visual perception device, and emphasizes intensity values in video data.

FIG. 3 illustrates the effect of the intensity value in the given video data 68 on the intensity of the respective laser beams for a particular color. Larger shapes indicate lasers with more intensity, due to a larger intensity value of the pixel in the video data 68, and smaller shapes indicate less intensity.

Figure 4:
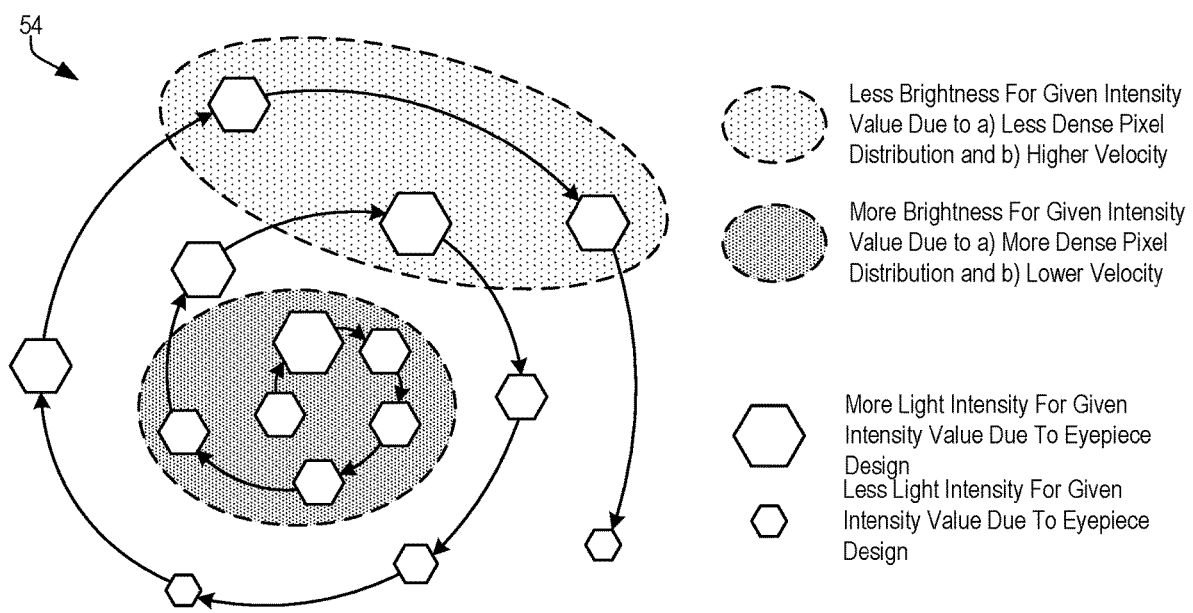
FIG. 4 is a view similar to FIG. 3 illustrating differences in brightness for a given intensity value from video data of each pixel in the pattern.

FIG. 4 illustrates variations in brightness and intensity that occur across a two-dimensional spiral pattern. In the case of a spiral pattern, center points of pixels are more closely spaced near a center of the spiral than in an outer region of the spiral due to a varying speed of the optical fiber and a constant rate of light projection for each pixel. For example, a distance between the first two pixels in the spiral pattern is less than the distance between the last two pixels. The difference in distances is primarily because of changes in velocity wherein the laser projector 18 travels slower between inner light beams and faster between outer light beams in the pattern 54. As a result, a central region of the spiral pattern appears more bright than outer regions of the spiral pattern.

Furthermore, the design of the image relay 20 may cause individual pixels in certain areas of the pattern to be brighter than pixel in other areas of the pattern when the pixels are outcoupled to the user's eye. In FIG. 4, it is assumed that the intensity values in the video data 68 for all the pixels are the same. Even if the intensity values for all the pixels are the same, certain pixels may appear brighter than other pixels due to design characteristics of the relay optics 20. To achieve desired output light levels from the relay optics 20, the effect of design characteristics of image relay 20 on input light is considered in selecting an input light gain value. Such an image relay-specific gain value may be stored within look-up table 30 within the relational pattern-based gain data 32 or may be stored as a separate look-up table. For example, the relay optics 20 may tend to have less light output from one or more corners; to compensate for this known eye piece design characteristic, gain for pixels associated with the corners of the relay optics 20 may be increased to increase the intensity of the light source when projecting that particular pixel, thereby providing a more uniform brightness output image for a user. Similarly, gain for pixels in a center of the relay optics 20, which may have high light output relative to other portions of the relay optics 20, may be decreased to improve overall brightness uniformity of the image seen by the user. In some implementations, the intensity of certain pixels may be increased while the intensity of others is decreased within a same image frame.

FIG. 3 thus shows the desired intensity for the respective pixels under the assumption that design characteristics of the image relay 20 do not alter pixel-to-pixel variations of intensity. However, it should be understood that the brightness variations shown in FIG. 3 may be further affected by pixel-to-pixel variations as shown in FIG. 4.

Referring again to FIGS. 1 and 2, the relational pattern-based gain data 32 includes calibration data to compensate for both the differences in brightness in different areas of the spiral pattern and the differences in intensity from one pixel to the next, for example due to different colors, as shown in FIG. 4. The reference locations in the relational pattern-based gain data 32 correspond to the location of each pixel in the pattern 54 created by the laser projector 18. The reference locations are typically a sequence of numbers that are used for look-up purposes.

The pixel counter 42 has a number of different functions, including (i) holding a number (ii) incrementing the number (iii) look-up (iv) forwarding a value and (v) reset. These functions are not shown as separate modules in the apparatus drawing of FIG. 1, but instead as separate functions in the flowchart of FIG. 2.

The pixel counter 42 includes a number that is initially set to zero (80). The pixel counter 42 then counts the pixels that are received by the video data receiver 26 such that, each time a new pixel is received by the video data receiver 26, the pixel counter 42 increases the previously stored number by one (82). The pixel counter 42 then uses the number to find the reference location within the relational pattern-based gain data 32 corresponding to the number tracked by the pixel counter 42. For the first number, the pixel counter 42 finds the first reference location. The pixel counter 42 thus serves as a correlator that is operable to correlate each pixel with a reference location in the relational pattern-based gain data 32. The pixel counter 42 then extracts the corresponding gain value for the reference location that it has found. The gain value represents a pattern-based gain that is determined from the respective number (86).

For purposes of illustration, FIG. 1 shows a line connecting a pattern-based gain value (for example, Gain Value R1) that has been selected using the pixel counter 42, pixel color information, and a reference location, to the beam modulator 28. This connection illustrates the relational look-up functionality of the look-up table 30 wherein a particular pattern-based gain value (Gain Value R1) corresponding to a particular reference location (Reference location 1) is forwarded to the beam modulator 28. It should however be understood that the pattern-based gain value (Gain Value R1) is thus returned to the pixel counter 42 and the pixel counter 42 provides an output of the pattern-based gain value (Gain Value R1) to the beam modulator 28.

The beam modulator 28 multiplies the intensity value from the video data 68 with the gain value from the pixel counter 42 as determined from the relational pattern-based gain data 32. The beam modulator 28 thus calculates a combined intensity value for the respective pixel (88) and a modified intensity value, namely the original intensity value in the video data as modified by the combined gain value. The beam modulator 28 then provides that modified intensity value to the laser projector 18 and the laser projector 18 activates the red laser 50A to an output light level that corresponds to the modified intensity value (90).

When the video data receiver 26 receives the second pixel, the pixel counter 42 increases the reference number by one (82). Each time that another pixel is received, the beam modulator 28 calculates a combined intensity value using the intensity value provided with the video data 68 and the gain value stored in the look-up table 30 associated with the number of the pixel as determined by the reference number stored in the pixel counter 42. The process is repeated until the last pixel in the pattern has been counted. In the case of a spiral pattern, the last pixel may correspond to the outermost pixel in the spiral pattern; however, any pixel can be associated with the beginning, and therefore end, of the pixel counter reference number series. The pixel counter 42 determines that the last pixel has been counted (84). If the last pixel has been counted, the pixel counter 42 resets the number to zero (80) and the scan pattern of the optical fiber 52 is ready to begin again for a subsequent image frame.

The fiber scanner has now reached the outermost point in its spiral pattern and subsequently returns to its original position by following a path that spirals inward from the outermost point back to its original location. The inward and outward spirals are formed at the same resonant frequency, although in some embodiments fewer revolutions are required to return the fiber scanner to its original position than when spiraling outward.

Figure 5A:
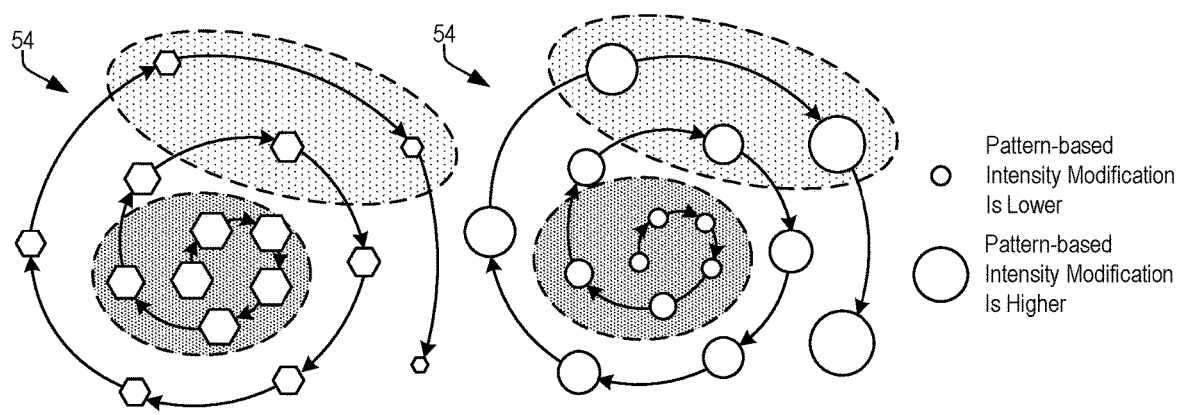
FIG. 5A is a view that illustrates a modification in intensity of pixels to compensate for differences in brightness of areas of the pattern.

FIG. 5A illustrates the effect of the relational pattern-based gain data 32 in FIG. 1 on the differences in the intensity and brightness due to scan beam velocity and pixel density associated with a spiral shaped scanning pattern of the optical fiber 52. In the pattern on the left, pixels in the center appear brighter than pixels on the outside of the image due to variations in pixel density caused by over the inherent form of the scan pattern when the optical fiber 52 is driven at a constant frequency of revolutions. In the pattern on the left, variations in brightness that may occur due to the design of the image relay 20 are ignored.

An optical fiber scanner has an optical fiber that bends so that a tip of the optical fiber follows a spiral pattern. The spiral pattern begins at a center point and revolves around the center point with an increasing radius. The scan pattern may include many revolutions about the center point. Each revolution may be formed at a frequency that is substantially constant. Each revolution is thus formed in approximately the same length of time. Because outer revolutions cover a longer distance than inner revolutions, the tip of the optical fiber has more velocity when forming the outer revolutions than when forming the inner revolutions. Due to changes in velocity of the scanner, some pixels appear brighter than other pixels. In particular, areas of an image where the scanning beam has a higher velocity results in pixels, or regions of the image, with less brightness. Referring back to FIG. 5A, pixels in regions of a scan pattern associated with higher brightness are indicated with larger hexagons. Pixels in an inner region have more brightness than pixels in an outer region.

For a number of reasons, pixels near a center of the spiral pattern are more densely spaced than pixels in an outer region, resulting in more overall brightness in the center than in an outer region. One reason why pixels in an inner region are more closely spaced is because the optical fiber travels faster when forming the outer circles than when forming the inner circles and pixels are created at a rate that remains substantially constant. Another reason is that, for reasons that are particular to a spiral pattern, there is more path per unit area in a center of a spiral pattern than in an outer region of the spiral pattern and a space between two inner circles may not be any wider than a space between outer circles.

In the pattern on the right of FIG. 5A, larger circles represent larger gain values to compensate for the brightness variations as shown in the pattern on the left. Pixels in outer regions of the pattern 54 are given more intensity by having higher gain values than the gain values associated with pixels in an inner region of the pattern 54. As a result, the pattern 54 is more uniform in its brightness from the inner region of the pattern 54 to the outer region of the pattern 54.

Figure 5B:
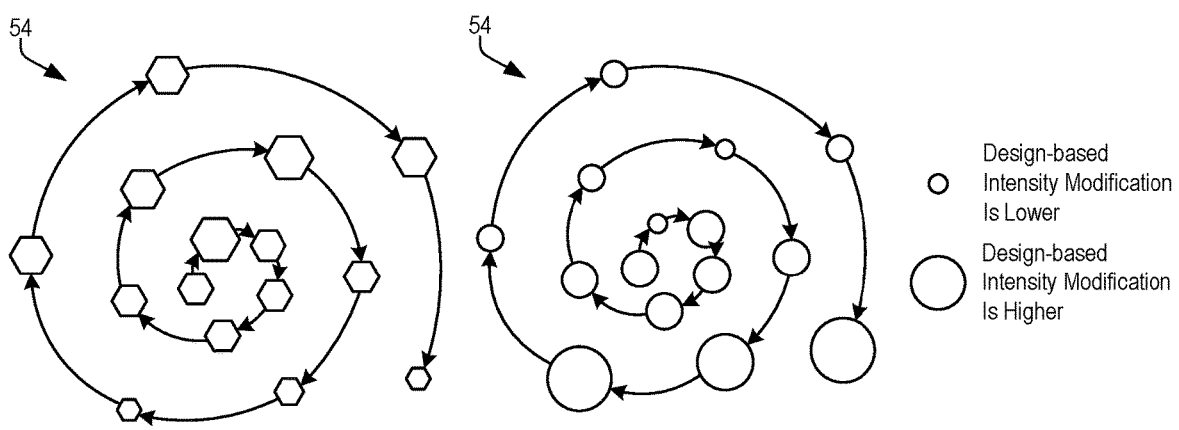
FIG. 5B is a view that illustrates modification of intensity to compensate for differences of brightness of pixels due to design characteristics of relay optics.

FIG. 5B illustrates the effect of the relational design-based modifying data 32 in FIG. 1 on variations in pixel brightness due to the characteristics of the design of the image relay 20. In the pattern 54 on the left, the pixels in the areas of the image frame that are perceived as being brighter due to the characteristics of the design of the optical relay 20 are shown in larger hexagons than pixels that have less brightness due the effects of the design characteristics of the optical relay 20.

In the pattern on the right of FIG. 5B, larger circles represent larger gain values to compensate for the brightness variations shown in the pattern on the left. When comparing the pattern on the right with the pattern on the left, it can be seen that smaller hexagons representing dimmer regions of the image correspond with larger circles representing larger gain values and larger hexagons representing brighter areas in the image correspond with smaller circles representing smaller gain values. Pixels that are less bright due to the design characteristics of the optical relay 20 correspond to larger gain values from the relational design-based modifying data 32 in FIG. 1 than pixels that are brighter due to the design characteristics of the optical relay 20. Should all the pixels thus have the same intensity value in their video data 68, the gain values shown in the pattern on the right will compensate for brightness variations caused by the optical relay 20 and thus result in output pixels from the optical relay 20 that are equally bright to create an image frame that a user perceives to have uniform brightness.

Figure 5C:
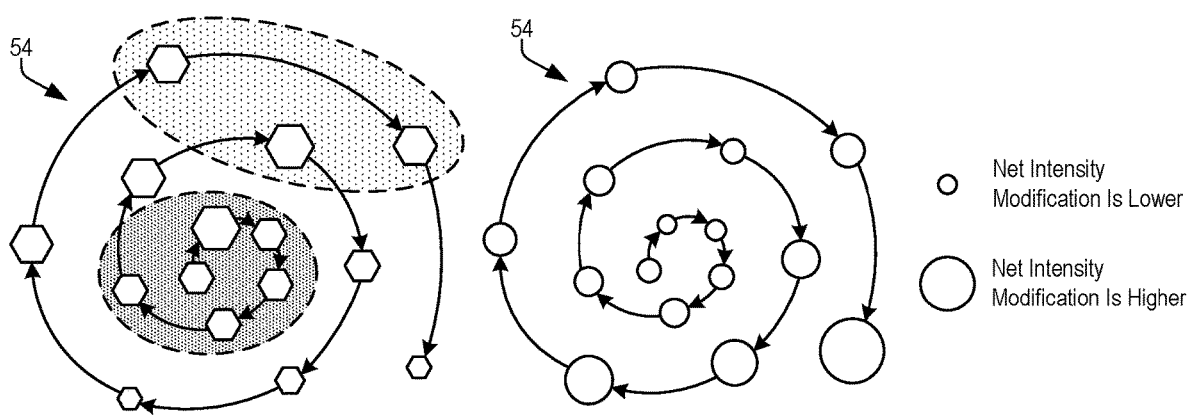
FIG. 5C is a view that shows net intensity modifications due to FIGS. 5A and 5B.

FIG. 5C illustrates the combination of the effects of FIGS. 5A and 5B. The pattern 54 on the left in FIG. 5C shows areas that tend to be brighter due to more pixel density than areas that have less pixel density and pixels that are brighter due to the design characteristics of the image relay 20. The pattern 54 on the right shows the net intensity modification when combining the gain values illustrated in the right panels of FIGS. 5A and 5B. The gain values in FIGS. 5A and 5B may, for example, be multiplied, or otherwise combined, with one another to obtain the gain values in the right side of FIG. 5C.

The gain values of FIG. 5C are received by the beam modulator 28 from the look-up table 30. The beam modulator 28 multiplies the gain values from the look-up table 30 with the intensity values in the video data 68 received from the video data receiver 26. The intensity values provided with the video data (as shown in FIG. 3) are thus multiplied by the gain values in FIG. 5C, which take into account scan pattern gain value compensations and eye piece design characteristic gain value compensations. These different gain value components combine to determine the overall gain values for each pixel generated by the laser projector 18 and thus the intensities of the individual pixels of the pattern 54 in FIG. 1.

In some embodiments, additional gain values are used to further adjust the intensity of one or more pixels produced by a laser projector. Referring back to FIGS. 1 and 2, the background camera 22 captures an image of the background 58 (92). The background camera 22 may, for example, periodically capture an image of the background 58. A background image may for example be captured every one to five seconds. The background camera 22 provides the image to the background analyzer 48. The background analyzer 48 analyzes the background 58 to determine lighter and darker areas (94) of the background as seen from the perspective of the background camera 22, which may be substantially similar to the view of the background seen by the user. The background analyzer 48 may then create, assign, and/or store gain data per pixel within the relational background-based modifying data 46 (96). The relational background-based gain data 46 may be similar to the relational pattern-based modifying data 32. Gain values are used to achieve an image frame output from the optical relay 20 that is perceived by a user to have uniform image brightness by a user. In additive display systems where background light combines with projected virtual light, virtual light projected over a lighter background appears less bright than virtual light projected over a darker background. To accommodate for this effect, gain values associated with dark or light backgrounds may be generated to adjust intensity of pixels from the laser projector 18 such that a final image output from the optical relay 20 appears uniform in brightness to a user even when the background light varies between light and dark areas. Adjusting for light and dark background regions may require lighter areas of the background 58 to be associated with reference locations having larger gain values than darker areas of the background 58. The background analyzer 48 receives successive images from the background camera 22 and updates the relational background-based modifying data 46 as lighter and darker areas of the background 58 change with movement of the user device.

The pixel counter 42 is connected to the relational background-based gain data 46 to determine a gain value corresponding to the reference number of the pixel counter and thus determines a background-based gain for the pixel associated with the reference number (98). The pixel counter 42 provides the background-based gain value for the number to the beam modulator 28. The beam modulator 28 includes the background-based gain value in the product of the combined gain value (88) used to adjust pixel intensity. An output of the beam modulator 28 to the laser projector 18 thus includes a factor that is a compensation based on lighter or darker areas of the background 58.

Figure 6:
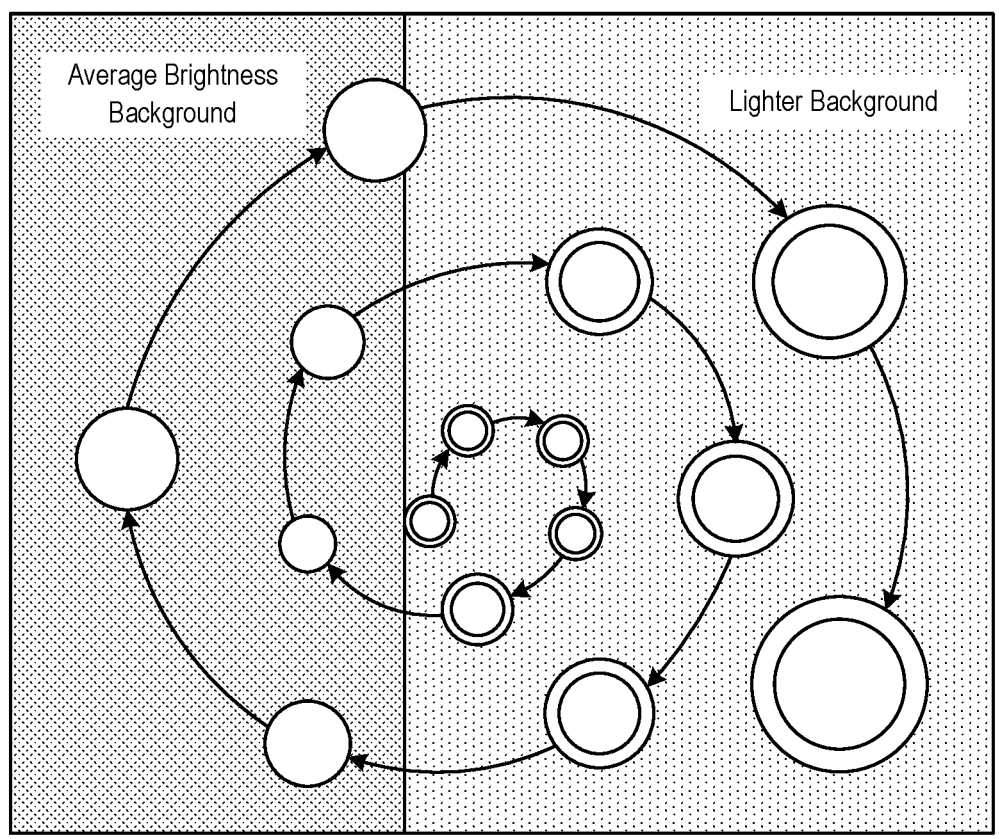
FIG. 6 is a view illustrating intensity modifications due to backgrounds that are lighter and darker.
Figure 6:
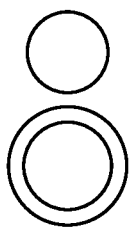

FIG. 6 illustrates intensity compensations due to areas of the background 58 having different brightness. For purposes of discussion, the background 58 has an average brightness background and a lighter background. Alternatively, the background 58 can have three different areas, including a darker background, an average brightness background and a lighter background. The terms "darker", "average", and "lighter" can indicate light intensity, color, saturation or combinations thereof. areas where the background 58 is of average brightness, or within a selected range of brightness, may remain unmodified. For purposes of illustration, only pattern-based intensity modifications as discussed with reference to FIG. 5A are shown in the area having average brightness background; that is, the intensities of pixels in outer revolutions of the scan pattern are adjusted to be higher than those in more central revolutions. Pixels that will be perceived by a user as overlaying a light background may be associated with increased background-based gain values to increase intensity of those pixels, and thus the brightness of the image in the associated with those pixels. For purposes of illustration, the pattern-based gain values as discussed with reference to FIG. 5A are shown in FIG. 6 on the lighter background area with the smaller inner circles and the further increased gain values associated with the brighter background region are shown with the larger outside. It should however be understood that other factors may also be included, for example the design-based modifications as discussed with reference to FIG. 5B.

In some embodiments, additional gain adjustment may be provided in response to a user's pupil location relative to the optical relay 20. Multiple tables of the pupil-based gain data 34 and 36 may be stored within the laser driver chip 12 at the same time that the look-up table 30 is stored within the laser driver chip 12 (104). One or more eye tracking camera 24 captures video data of the eye 56 (106).

Figure 7A:
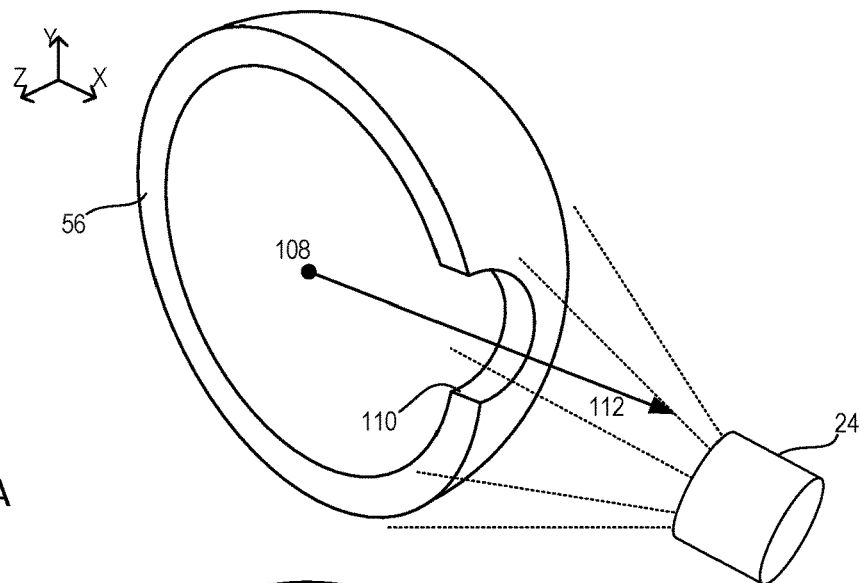
FIGS. 7A to 7C illustrate an eye and an eye tracking camera that is used to capture the eye and rotation of a pupil about a center of the eye.

FIG. 7A illustrates the eye 56 and the eye tracking camera 24. The eye 56 has a center 108 and a pupil 110. A gaze direction 112 is defined by an eye tracking system (not shown). In some embodiments, a gaze direction may be defined using points at the center 108 of the eye and a center of the pupil 110. The eye tracking camera 24 may capture an image of the eye 56 from which the location of the pupil 110 can be determined.

Figure 7B:
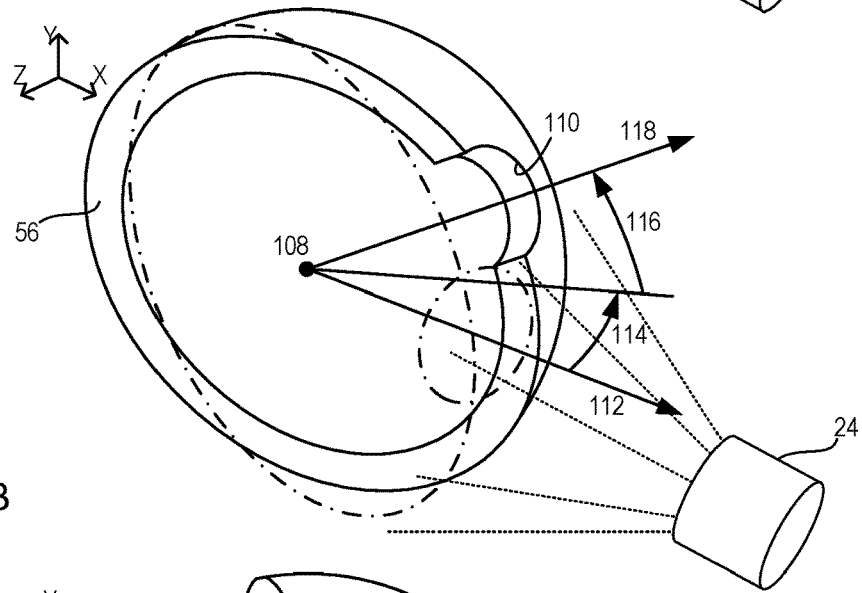

FIG. 7B shows the eye 56 after it has rotated about the center 108 as represented by the angle 114 in a horizontal plane and the angle 116 in a vertical plane and has established a new gaze direction 118. The eye tracking camera 24 continues to capture images of the eye 56, and tracks the location and movement of the pupil 110.

Figure 7C:
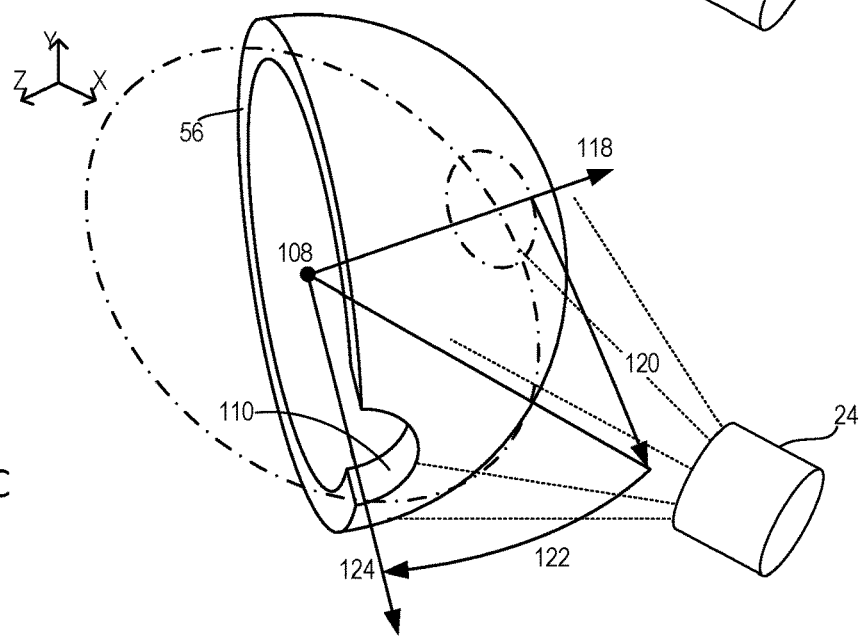

FIG. 7C shows the eye 56 after it has rotated about the center 108 as represented by the angle 120 in a vertical plane and an angle 122 in a horizontal plane and has established a new gaze direction 124. The eye tracking camera 24 continues to capture an image of the eye 56 and tracks the movement of the pupil 110. Referring again to FIGS. 1 and 2, the eye tracking camera 24 provides the data captured in FIGS. 7A to 7C to the eye analyzer 38. The eye analyzer 38 then analyzes the eye 56 to determine the pupil location (126). The eye analyzer 38 calculates the center 108 in FIGS. 7A to 7C and the gaze directions 112, 118 and 124.

Every time that the gaze direction of the eye 56 changes, or after a predetermined time increment, the eye analyzer 38 provides the new gaze direction to the write/read alternator 40. The write/read alternator 40 selects a particular table that holds a respective set of relational pupil-based modifying data 34 or 36 based on the gaze direction received from the eye analyzer 38 (128). Only two sets of relational pupil-based modifying data 34 or 36 are shown, although many more tables may be included, each for holding gain values when a respective gaze angle is calculated. Three of the sets of relational pupil-based gain data hold gain values that modify intensity values as shown in FIGS. 7A, 7B and 7C respectively. Once the respective relational pupil-based gain data 34 or 36 is selected by the write/read alternator 40, the write/read alternator 40 connects the table to the pixel counter 42. The respective relational pupil-based gain data 34 or 36 data similar to the relational pattern-based gain data 32 in the look-up table 30. The number that is set by the pixel counter 42 is used to select to a respective gain value from the respective relational pupil-based gain data 34 or 36. The pixel counter 42 thus determines a pupil-based gain value for the number (129). The pixel counter 42 provides the pupil-based gain value to the beam modulator 28. The beam modulator 28 includes the pupil-based gain value for the number as a factor when calculating the combined gain value for the pixel (88).

FIGS. 8 and 9A to 9C illustrate intensity modifications based on pupil gaze direction. FIG. 8 shows no pupil-based modification of intensity and only shows pattern-based intensity modifications as shown in the pattern 54 on the right in FIG. 5A. FIG. 8 thus does not show any intensity modifications as necessitated due to the design of the optical relay 20 as discussed with reference to FIG. 5B or due to the background 58 as discussed with reference to FIG. 6.

In FIG. 9A, the pupil is rotated to have a gaze direction to the left relative to a center of the pattern 54 as indicated by the cross-hatching. As a result, pixels to the left have more gain than in FIG. 8. Pixels further from the gaze direction of the pupil, for example the pixels on the right, can have less gain than compared to FIG. 8. Such a configuration may advantageously allow for some power savings, thereby improving battery life for the augmented reality device. Pixels located near the gaze direction of the pupil, but not at the gaze direction of the pupil, can have unmodified gain when compared to FIG. 8.

In FIG. 9B, the pupil is rotated to have a gaze direction that corresponds to a center of the pattern 54. Pixels within a center of the pattern 54 where the gaze direction of the pupil is located have more gain than compared to FIG. 8, while pixels around a perimeter of the pattern 54 have less gain than compared to FIG. 8 and intermediate pixels have unmodified gain.

In FIG. 9C, the pupil is rotated to a location that has a gaze direction towards the right of the pattern 54. Pixels at the gaze direction of the pupil have more gain than compared to FIG. 8, while pixels further from the pupil, for example pixels on the left, have less gain than compared to FIG. 8. Intermediate pixels have unmodified gain when compared to FIG. 8.

Figure 10:
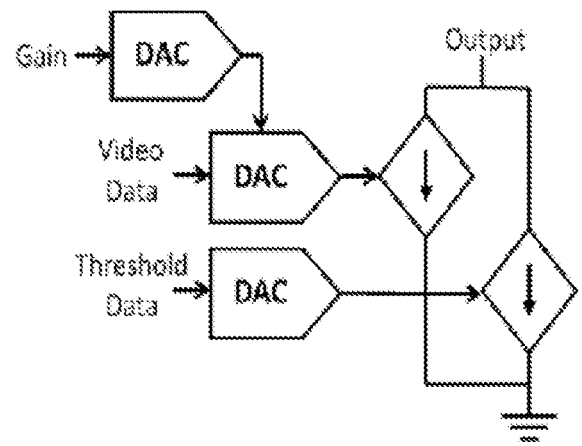
FIG. 10 is a block diagram illustrating one approach for constructing a laser driver chip.

FIG. 10 shows an example of a laser driver chip architecture. Video data with an initial current is input to a first digital-to-analog converter (DAC) and a gain is provided as a reference value to the to the first DAC via a second DAC. The video data is modified by the gain reference value to produce modified video data with a modified current. A threshold current, which may be substantially constant, is provided to a third DAC. The modified video data current is added to the threshold current to create an output current which drives a laser light source. As discussed previously herein, it may be advantageous to provide one or more gain values per pixel based on one or more of a known scan pattern, the design of an optical relay, an environment background, and a user gaze direction. Data storage for one or more of the gain value data sets may be disposed on the laser driver chip; however, one or more of the gain value data sets may be disposed off of the chip. Architecture layouts to facilitate such improvements in image frame output through an optical relay are discussed below.

Figure 11:
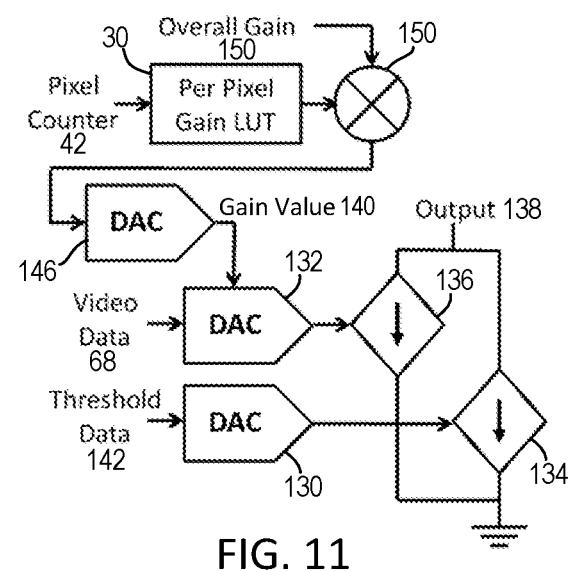
FIG. 11 is a block diagram illustrating details of a laser driver chip of the visual perception device of FIG. 1, according to one embodiment.

FIG. 11 shows the beam modulator 28, look-up table 30 and pixel counter 42 in more detail for one laser. The laser driver chip 12 in FIG. 1 may for example be a MAXIM MAX3601 chip that is capable of driving three lasers (red, green, and blue) at video pixel rates of 160 MHz to 250 MHz. Each drive channel has two digital-to-analog converters that are used as first and second current drivers 130 and 132 to first and second current sources 134 and 136 respectively. The first current driver 130 is used to output the relatively constant laser threshold current e.g., 80 mA maximum for a MAX3601 chip (referred to herein as a threshold DAC or TDAC). The second drive channel 132 provides an output of the video modulated current e.g., 320 mA maximum for a MAX3601 chip (referred to herein as a video DAC or VDAC). The currents from the current sources 134 and 136 are added together to form the current driving the laser at an output 138. Each current driver 130 and 132 has a gain setting used to scale the maximum output current for that driver.

The video data 68 is provided through a fast interface and allows from 8 to 10 bit data at video rates. A gain value 140 to the second current driver 132 and a threshold data 142 to the first current driver 130 are sent through slow interfaces, typically less than 1 MHz update rate and cannot be varied at video rates. The gain value 140 sets the maximum current output for the specific laser such that the video scales over the required current range and yields the maximum number of color values. In effect the video current is equal to the intensity value in video data 68 times the gain value 140.

The drive channel further has a gain-setting DAC (GDAC) 146 connected to the second current driver 132 to provide the gain value 140. A multiplier 148 is used to multiply separate gains for each pixel from the look-up table 30 and from the video data 68 are multiplied by an overall gain 150 that is used for ambient light or overall brightness adjustments. The result is converted to an analog voltage and used as the gain (reference) input to the second current driver 132.

Figure 12:
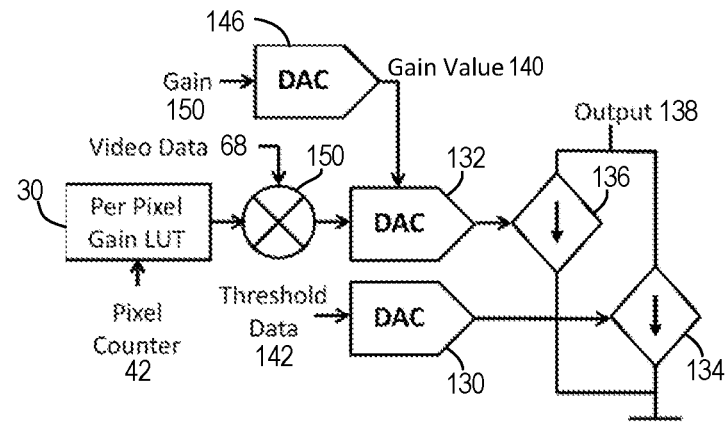
FIG. 12 is a block diagram illustrating details of a laser driver chip of the visual perception device of FIG. 1, according to another embodiment.

FIG. 12 shows an alternate configuration wherein the intensity value in the video data 68 is multiplied by the per-pixel gain in the look-up table 30 and the result is provided the second current driver 132. The second current driver 132 requires more input bits in the configuration of FIG. 11 that in the configuration of FIG. 10. The VDAC that forms the second current driver 132 is usually slower than the GDAC 146 in a MAXIM or a MAX3601 chip and it would be more difficult to achieve high video rates using the configuration of FIG. 11 that in the configuration of FIG. 10.

Figure 13:
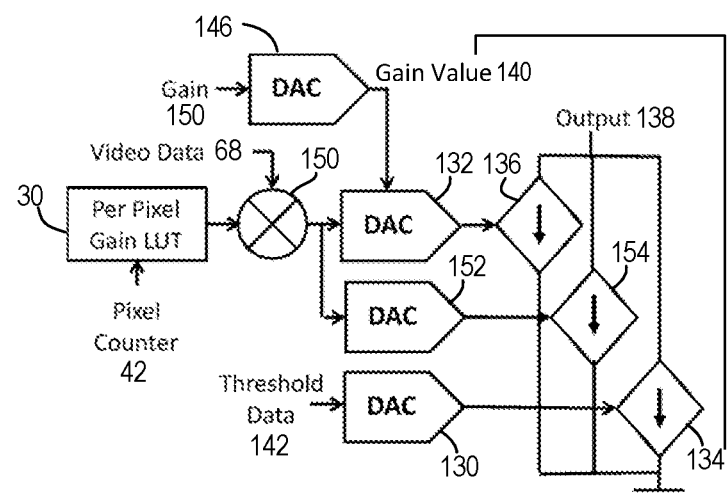
FIG. 13 is a block diagram illustrating details of a laser driver chip of the visual perception device of FIG. 1, according to further embodiment.

FIG. 13 shows a further configuration wherein the second current driver 132 and a third current driver 152 form two video current drivers that are used to drive separate current sources 136 and 154 respectively. The second current driver 132 has a higher reference voltage than the third current driver 152. A higher bit VDAC is formed by using two lower bit VDACs.

Figure 14:
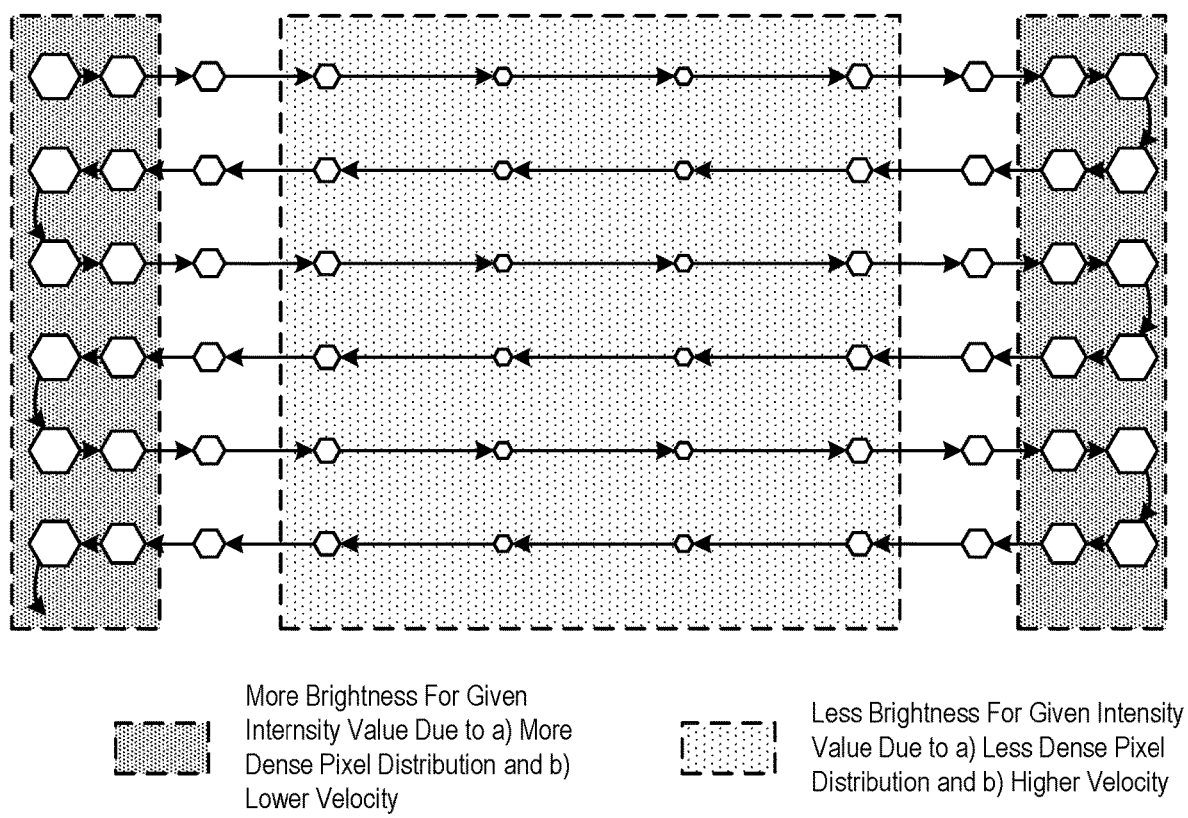
FIG. 14 is a view of a pattern illustrating areas of more brightness and areas of less brightness due to variations in pixel density distribution.

FIG. 14 illustrates a different scan pattern, such as a raster scan, than the spiral scan pattern of FIG. 3. Pixels that appear to have more brightness due to higher pixel density are indicated with larger hexagons. A tip of a resonating optical fiber that follows a raster scan pattern of FIG. 13 travels faster in a central region of the scan pattern than in regions on the left and on the right where the scan pattern changes direction. To compensate for reduced brightness in the central region of the image frame caused by decreased pixel density compared with the right and left side regions, pixels in an inner region may have a modified intensity that is higher than pixels in region on the left and the right. Other scan patterns may have different distributions of pixels and have different areas with more or less brightness due to pixel density variations.

The optical fiber follows a pattern from left to right and then returning from right to left on some slightly lower path and proceeds in this manner until it has completed its lowest path. When the optical fiber has completed its lowest path, it proceeds to follow pattern from left to right and then from right to left on a slightly higher path and proceeds in this manner until it reaches its original starting position at the top.

The invention may find application when using scanners other than optical fiber scanners, for example when using a MEMS scanner. A MEMS scanner has a MEMS mirror that reflects laser light. The MEMS mirror rotates about one or more axes so that the laser light that reflects from the MEMS mirror follows a path that has a predetermined pattern. The MEMS mirror typically resonates at a frequency. Because of the way that the MEMS mirror is configured, the pattern may or may not be a spiral pattern or a raster scan pattern as discussed above with respect to the path that is created with an optical fiber scanner. A MEMS scanner may create a pattern at frequency that results in differences in intensities between pixels and differences in densities of pixels.

As described, one or more lasers are used to generate red, green, blue and optionally infrared light. One skilled in the art will appreciate that the invention may also find application when a superluminescent light emitting diode (LED) or other laser or laser-like system is used.

Figure 15:
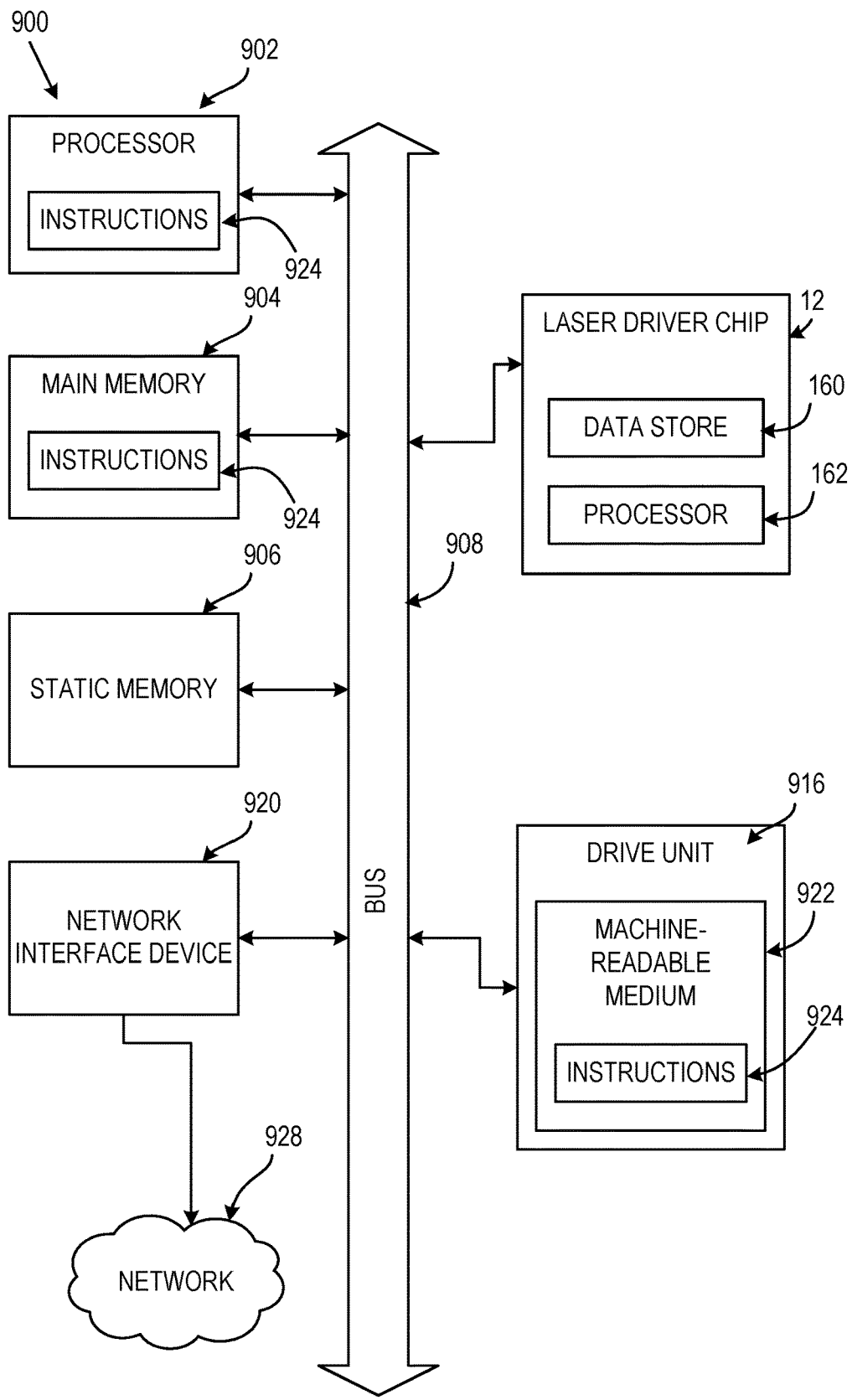
FIG. 15 is a block diagram of a machine in the form of a computer that can find application in the present invention system, in accordance with one embodiment of the invention.

FIG. 15 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The laser driver chip 12 includes a data store 160 and its own processor 162. The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a disk drive unit 916, and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A visual perception device comprising:
 a data store;
 relational gain data stored in the data store and representing a plurality of reference locations and a plurality of gain values, each gain value corresponding to a respective reference location;
 a video data receiver connectable to a video data channel to receive video data including a plurality of pixels;
 a correlator connected to the relational gain data and the video data receiver and operable to correlate each pixel with a reference location in the relational gain data to find a gain value corresponding to the respective pixel;
 a beam modulator connected to the video data receiver and the correlator and operable to modify an intensity value of the respective pixel based on the gain value for the respective pixel to determine a modulated gain value for the respective pixel; and
 a laser projector connected to the beam modulator and operable to generate a respective beam of light and transmit the beams of light in a pattern wherein the beams of light are spatially separated in two dimensions with the respective beams of light in the two dimensions being modulated according to the respective modulated gain values of each respective one of the pixels.

2. The device of claim 1, further comprising:
 a look-up table, wherein the relational gain data is stored in the look-up table.

3. The device of claim 1, wherein the correlator is a pixel counter that counts the pixels in the video data and determines a respective reference location in the reference data based on the counting of the pixels, the relational gain data includes three different gain values for each reference location, each gain value corresponding to a different color, the video data includes a plurality of pixels for each of the three colors, and pixels of all three colors are correlated with reference locations in the relational gain data to find a gain value corresponding to the respective pixel.

4. The device of claim 1, wherein the reference locations correspond to the pattern that is created by the projector.

5. The device of claim 4, wherein first and second adjacent light beams in the pattern are further from one another than third and fourth light beams in the pattern and the gain values create more intensity for the first and second light beams than for the third and fourth light beams.

6. The device of claim 5, wherein the laser projector travels faster from the first light beam to the second light beam in the pattern than from the third light beam to the fourth light beam in the pattern.

7. The device of claim 5, wherein the pattern is a spiral pattern and the first and second light beams are in an outer region of the pattern compared to the third and fourth light beams in the pattern.

8. The device of claim 4, further comprising:
an eye piece, the beams entering the eye piece, reflecting within the eye piece and exiting the eye piece, wherein the eye piece alters an intensity of the beams relative to one another and the gain values compensate for the eye piece altering the intensity of the beams relative to one another.

9. The device of claim 1, wherein each pixel in the video data has as respective intensity value and the gain value in the relational data is a gain value that the beam modulator uses to modify the intensity value in the video data.

10. The device of claim 9, further comprising:
a background camera that captures a background; and
a background analyzer connected to the background camera that determines at least one gain value based on the background, wherein the beam modulator uses the gain value based on the background to modify the intensity value in the video data.

11. The device of claim 10, wherein the background analyzer determines at least a first gain value for a lighter area of the background and a second gain value for a darker area of the background and the modulator modifies the intensity value of respective pixels such that a pixel in the lighter area of the background has more intensity than a pixel in a darker area of the background.

12. The device of claim 9, further comprising:
an eye camera that captures an eye; and
an eye analyzer connected to the eye camera that determines at least one gain value based on a gaze direction of a pupil of the eye, wherein the beam modulator uses the gain value based on the gaze direction of the pupil to modify the intensity value in the video data such that pixels in a gaze direction of the pupil have more intensity than pixels distant from the pupil.

13. The device of claim 12, wherein the beam modulator reduces an intensity of pixels distant from the gaze direction of the pupil.

14. The device of claim 1, wherein the beam modulator includes:
a video data digital-to-analog converter (VDAC) that receives the video data;
a gain digital-to-analog converter (GDAC) having an input for receiving a gain setting and an output connected to the VDAC to set a gain on the VDAC; and
a multiplier connected to the relational data to modify an output of the VDAC.

15. The device of claim 14, wherein the multiplier multiplies the gain that is provided to the GDAC with the gain values of the pixels to modulate the gain that is provided to the GDAC.

16. The device of claim 14, wherein the multiplier multiplies the gain that is provided to the VDAC with the gain values of the pixels to modulate the gain that is provided to the VDAC.

17. The device of claim 16, wherein the VDAC is a first VDAC, further comprising:
a second VDAC, wherein the multiplier multiplies the gain that is provided to the second VDAC with the gain values of the pixels to modulate the gain that is provided to the VDAC; and
first and second current sources connected to and driven by the first and second VDAC's respectively, the current sources being connected in parallel.

18. The device of claim 1 further comprising:
a laser driver chip, wherein the beam modulator and the relational gain data are located on the laser driver chip.

* * * * *